United States Patent
Imura et al.

(10) Patent No.: US 11,708,911 B2
(45) Date of Patent: Jul. 25, 2023

(54) SLIDING COMPONENT

(71) Applicant: EAGLE INDUSTRY CO., LTD., Tokyo (JP)

(72) Inventors: Tadatsugu Imura, Tokyo (JP); Hideyuki Inoue, Tokyo (JP); Yuichiro Tokunaga, Tokyo (JP); Yuta Negishi, Tokyo (JP); Yuki Maetani, Tokyo (JP); Ayano Tanishima, Tokyo (JP)

(73) Assignee: EAGLE INDUSTRY CO., LTD.

( * ) Notice: Subject to any disclaimer, the term of this patent is extended or adjusted under 35 U.S.C. 154(b) by 106 days.

(21) Appl. No.: 16/649,074

(22) PCT Filed: Oct. 2, 2018

(86) PCT No.: PCT/JP2018/036782
§ 371 (c)(1),
(2) Date: Mar. 19, 2020

(87) PCT Pub. No.: WO2019/069887
PCT Pub. Date: Apr. 11, 2019

(65) Prior Publication Data
US 2020/0224768 A1 Jul. 16, 2020

(30) Foreign Application Priority Data
Oct. 3, 2017 (JP) ................................. 2017-193251

(51) Int. Cl.
*F16J 15/34* (2006.01)
(52) U.S. Cl.
CPC ......... *F16J 15/3412* (2013.01); *F16J 15/342* (2013.01); *F16J 15/3424* (2013.01)

(58) Field of Classification Search
CPC ..... F16J 15/3412; F16J 15/342; F16J 15/3424
See application file for complete search history.

(56) References Cited

U.S. PATENT DOCUMENTS

| 4,789,250 A | 12/1988 | Schluter |
| 5,071,141 A | 12/1991 | Lai |

(Continued)

FOREIGN PATENT DOCUMENTS

| CN | 101016949 | 8/2007 | |
| CN | 201087764 | 7/2008 | ............... F16J 15/16 |

(Continued)

OTHER PUBLICATIONS

International Search Report dated Sep. 25, 2018, issued in International Application No. PCT/JP2018/075475 (1pg).

(Continued)

*Primary Examiner* — Nicholas L Foster
(74) *Attorney, Agent, or Firm* — Hayes Soloway P.C.

(57) ABSTRACT

A pair of sliding components have sliding faces (S) that slide with respect to each other, wherein at least one of the sliding faces (S) includes at least one dimple group (11) constituted by plural dimples (12), and each dimple group (11) includes at least one opening portion (11a) that is arranged in the one of the sliding faces (S) and radially open to the outside the one of the sliding faces (S). In the sliding components, a dynamic pressure generation mechanism can easily be formed, and a lubricating performance and a sealing performance can improve.

5 Claims, 18 Drawing Sheets

(56) References Cited

U.S. PATENT DOCUMENTS

| | | | | |
|---|---|---|---|---|
| 5,092,612 | A | * | 3/1992 | Victor .................. F16J 15/3412 277/400 |
| 5,368,314 | A | * | 11/1994 | Victor .................. F16J 15/3412 277/400 |
| 5,834,094 | A | | 11/1998 | Etsion |
| 6,726,213 | B2 | * | 4/2004 | Wang .................. F16J 15/3412 277/400 |
| 6,902,168 | B2 | | 6/2005 | Tejima |
| 8,814,433 | B2 | | 8/2014 | Tokunaga |
| 9,169,931 | B2 | | 10/2015 | Tokunaga |
| 9,228,660 | B2 | | 1/2016 | Hosoe et al. |
| 9,347,566 | B2 | * | 5/2016 | Tokunaga ............ F16J 15/3412 |
| 9,494,239 | B2 | | 11/2016 | Hosoe et al. |
| 9,772,037 | B2 | * | 9/2017 | Itadani ................. F16J 15/3424 |
| 9,829,043 | B2 | * | 11/2017 | Inoue ................... F16C 17/02 |
| 9,915,289 | B2 | * | 3/2018 | Inoue ................... F16J 15/3424 |
| 9,951,873 | B2 | | 4/2018 | Inoue et al. |
| 9,964,215 | B2 | * | 5/2018 | Itaclani .................... F16J 15/34 |
| 9,970,478 | B2 | * | 5/2018 | Inoue ................... F16C 33/743 |
| 10,132,411 | B2 | * | 11/2018 | Hosoe ................... F16C 17/045 |
| 10,473,220 | B2 | | 11/2019 | Tokunaga |
| 11,035,411 | B2 | * | 6/2021 | Imura ................... F16C 33/743 |
| 11,053,975 | B2 | * | 7/2021 | Imura ................... F16C 33/1025 |
| 11,168,793 | B2 | * | 11/2021 | Tanishima ........... F16J 15/3404 |
| 11,248,707 | B2 | * | 2/2022 | Imura ................... F16J 15/3424 |
| 2003/0178781 | A1 | | 9/2003 | Tejima |
| 2003/0189294 | A1 | * | 10/2003 | Tejima ................. F16J 15/3424 277/399 |
| 2011/0215531 | A1 | | 9/2011 | Tokunaga et al. |
| 2011/0233872 | A1 | | 9/2011 | Iguchi et al. |
| 2013/0209011 | A1 | | 8/2013 | Tokunaga |
| 2014/0167361 | A1 | | 6/2014 | Osada et al. |
| 2014/0167362 | A1 | * | 6/2014 | Hosoe .................... F16J 15/342 277/400 |
| 2014/0217676 | A1 | | 8/2014 | Hosoe et al. |
| 2014/0294331 | A1 | | 10/2014 | Tokunaga |
| 2015/0115537 | A1 | | 4/2015 | Tokunaga |
| 2015/0123350 | A1 | * | 5/2015 | Itadani ................. F16J 15/3412 277/400 |
| 2015/0167847 | A1 | * | 6/2015 | Tokunaga ............ F16J 15/3412 277/400 |
| 2015/0240950 | A1 | * | 8/2015 | Takahashi ............. F16J 15/363 277/377 |
| 2015/0260292 | A1 | | 9/2015 | Inoue et al. |
| 2016/0033045 | A1 | | 2/2016 | Itadani et al. |
| 2016/0195139 | A1 | * | 7/2016 | Inoue ................... F16J 15/3412 384/138 |
| 2017/0227056 | A1 | * | 8/2017 | Inoue ................... F16C 17/02 |
| 2017/0234431 | A1 | | 8/2017 | Katori et al. |
| 2018/0017163 | A1 | * | 1/2018 | Hosoe ................... F16J 15/164 |
| 2018/0038411 | A1 | * | 2/2018 | Inoue ................... F16J 15/3412 |
| 2018/0058502 | A1 | * | 3/2018 | Hosoe ................ B23K 26/0624 |
| 2018/0172162 | A1 | | 6/2018 | Tokunaga et al. |
| 2018/0187785 | A1 | | 7/2018 | Katori et al. |
| 2018/0299015 | A1 | * | 10/2018 | Itadani ................. F16J 15/3448 |
| 2019/0170257 | A1 | * | 6/2019 | Hosoe ................... F16J 15/3412 |
| 2019/0264737 | A1 | | 8/2019 | Itadani |
| 2019/0316682 | A1 | | 10/2019 | Negishi et al. |
| 2020/0158162 | A1 | * | 5/2020 | Imura ................... F16C 17/04 |
| 2020/0182356 | A1 | | 6/2020 | Itadani et al. |
| 2020/0224722 | A1 | * | 7/2020 | Imura ................... F16C 33/107 |
| 2020/0224768 | A1 | * | 7/2020 | Imura ................... F16J 15/3412 |
| 2020/0332901 | A1 | * | 10/2020 | Imura ................... F04D 29/124 |
| 2020/0378501 | A1 | * | 12/2020 | Tanishima ........... F16J 15/3404 |
| 2021/0048062 | A1 | * | 2/2021 | Masumi ................ F16C 17/102 |
| 2021/0048106 | A1 | | 2/2021 | Imura |
| 2021/0054934 | A1 | * | 2/2021 | Imura ..................... F16J 15/34 |
| 2021/0301865 | A1 | * | 9/2021 | Imura ................... F16C 33/107 |
| 2021/0364034 | A1 | * | 11/2021 | Okada ................... F16C 17/045 |

FOREIGN PATENT DOCUMENTS

| | | | |
|---|---|---|---|
| CN | 101644333 | 2/2010 | ............... F16J 15/34 |
| CN | 103090005 | 4/2014 | |
| CN | 203641506 | 6/2014 | |
| CN | 104520617 | 4/2015 | ............... F16J 15/34 |
| EP | 1350996 | 10/2003 | |
| EP | 3048341 | 7/2016 | |
| EP | 3627011 | 3/2020 | |
| JP | S60222667 | 11/1985 | |
| JP | S631814 | 1/1988 | |
| JP | S63119927 | 8/1988 | |
| JP | H0560247 A | 3/1993 | |
| JP | 2001221179 A | 8/2001 | |
| JP | 2003343741 | 12/2003 | |
| JP | 2004003578 | 1/2004 | |
| JP | 2004162907 | 6/2004 | |
| JP | 2007092983 | 4/2007 | |
| JP | 4316956 | 8/2009 | |
| JP | 2009250378 | 10/2009 | ............... F16J 15/34 |
| JP | 2010133496 | 6/2010 | |
| JP | 4557223 | 10/2010 | |
| JP | 2011185292 | 9/2011 | |
| JP | 5456772 | 4/2014 | |
| JP | 5518527 | 6/2014 | |
| JP | 6058018 B2 | 1/2017 | |
| JP | 6076985 | 2/2017 | |
| WO | WO02093 046 | 11/2002 | |
| WO | WO2013021839 | 2/2013 | |
| WO | 2013035503 A1 | 3/2013 | |
| WO | WO2013031530 | 3/2013 | |
| WO | WO2013176009 | 11/2013 | ........... F16J 15/3422 |
| WO | WO2014024742 | 2/2014 | ........... F16J 15/3412 |
| WO | WO2014112455 | 7/2014 | |
| WO | WO2014174725 | 10/2014 | |
| WO | WO2015041048 | 3/2015 | |
| WO | WO2016035860 | 3/2016 | |
| WO | WO2016129553 | 8/2016 | |
| WO | WO2016143 721 | 9/2016 | |
| WO | WO2016203 878 | 12/2016 | |
| WO | WO2017002646 | 1/2017 | |
| WO | 2017061406 A1 | 4/2017 | |
| WO | WO 2017/061406 | 4/2017 | ............... F16J 15/34 |
| WO | WO2018043307 | 3/2018 | |
| WO | WO2018070265 | 4/2018 | |
| WO | WO2018088353 | 5/2018 | |
| WO | WO2018092829 | 5/2018 | |

OTHER PUBLICATIONS

International Search Report dated Jul. 10, 2018, issued in International Application No. PCT/JP2018/018623 (1 pg).
International Search Report dated Jun. 26, 2018, issued in International Application No. PCT/JP2018/018624 (2 pgs).
International Search Report dated Sep. 25, 2018, issued in International Application No. PCT/JP2018/026251 (2 pgs).
International Search Report dated Aug. 7, 2018, issued in International Application No. PCT/JP2018/026107 (2 pgs).
European Search Report dated Feb. 17, 2021, issued in European Application Serial No. 18832266.3 (7 pages).
European Search Report dated Dec. 21, 2020, issued in European Application Serial No. 18802992.0 (6 pages).
European Official Action dated Jan. 27, 2022, issued in European Application Serial No. 18802992.0 (4 pages).
European Search Report dated Dec. 23, 2020, issued in European Application Serial No. 18803055.5 (6 pages).
Official Action issued in related application derail U.S. Appl. No. 16/610,844, dated Jan. 27, 2021 (12 pages).
Official Action issued in related application derail U.S. Appl. No. 16/626,838, dated Sep. 30, 2020 (14 pages).
International Search Report (ISR) dated Dec. 4, 2018, issued for International application No. PCT/JP2018/036782. (1 page).
Notice of Reasons for Refusal issued in Japanese Patent Appln. Serial No. 2019-546709, dated Jul. 5. 2022, with machine English translation, 9 pages.
U.S. Appl. No. 16/623,705, filed Dec. 17, 2019.
U.S. Appl. No. 16/610,855, filed Nov. 4, 2019.
U.S. Appl. No. 16/622,826, filed Dec. 13, 2019.
Chinese Official Action issued in Chinese Patent Appln. Serial No, 201880063300.0, dated Jun. 30, 2022, with machine English translation, 11 pages.

(56) References Cited

OTHER PUBLICATIONS

Chinese Official Action received in related Chinese Patent Application Serial No. 201880063300.0, dated Mar. 9, 2022 with translation (13 pages).

* cited by examiner

FIG. 13
(a)
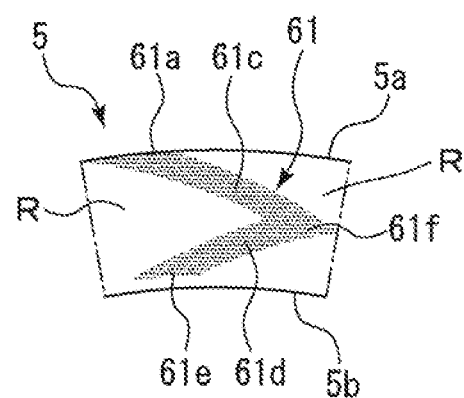
(b)
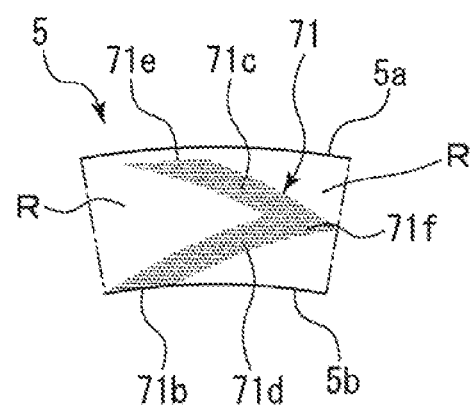

FIG. 14
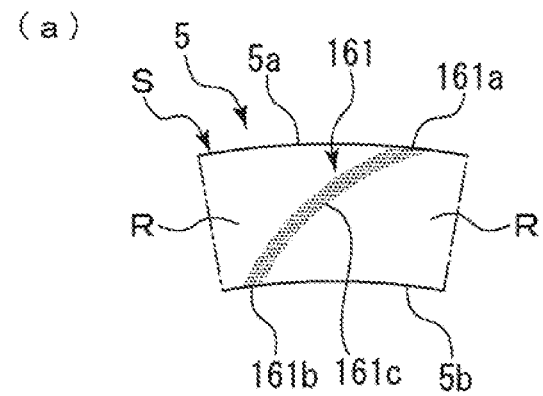
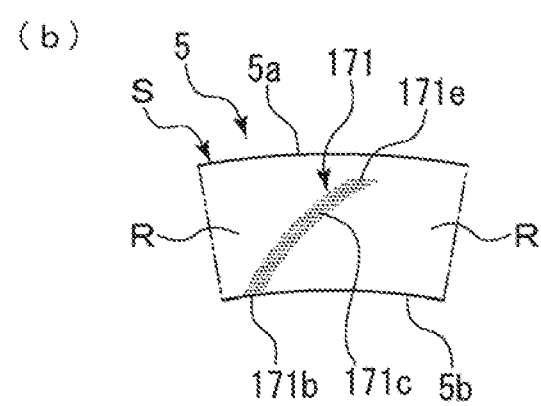
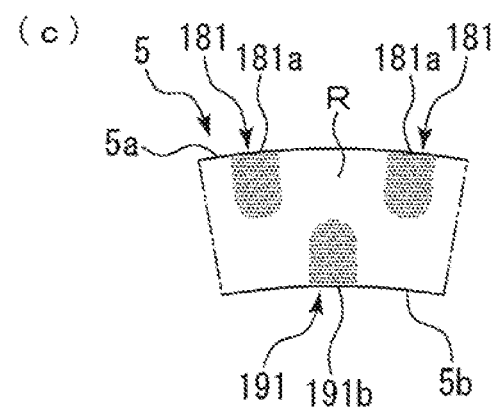

FIG. 17
(a)
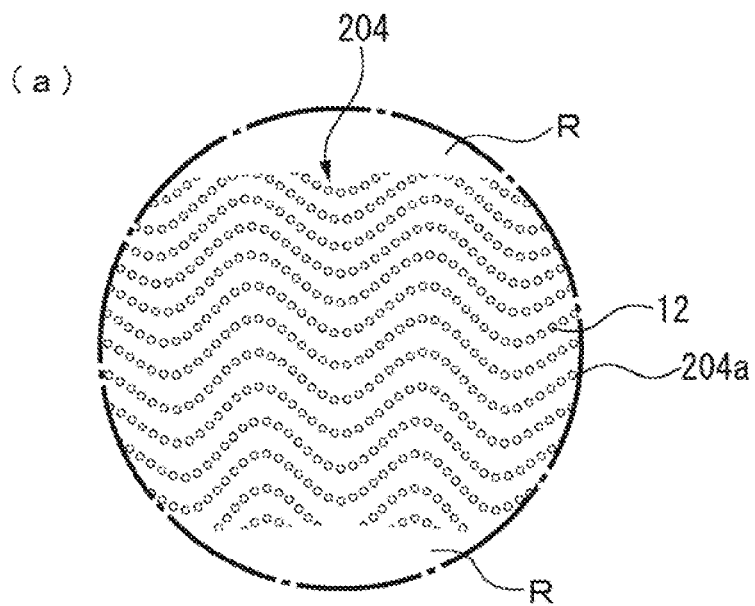
(b)
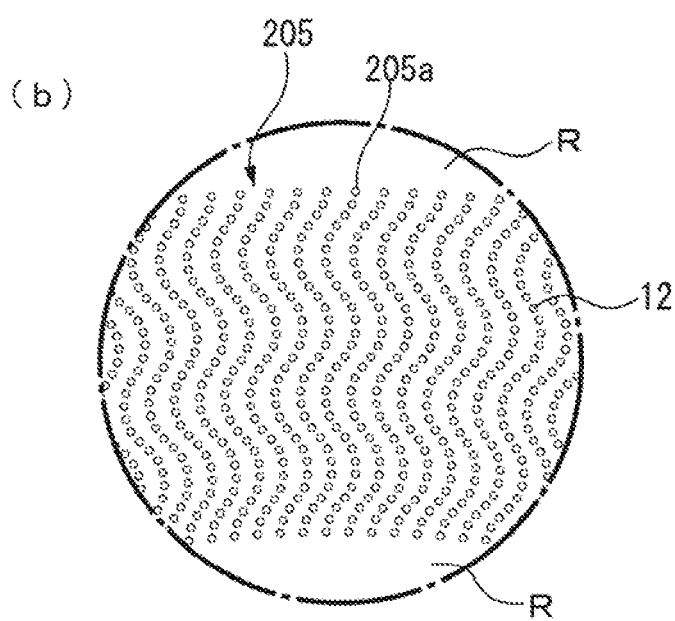

FIG. 18
(a)
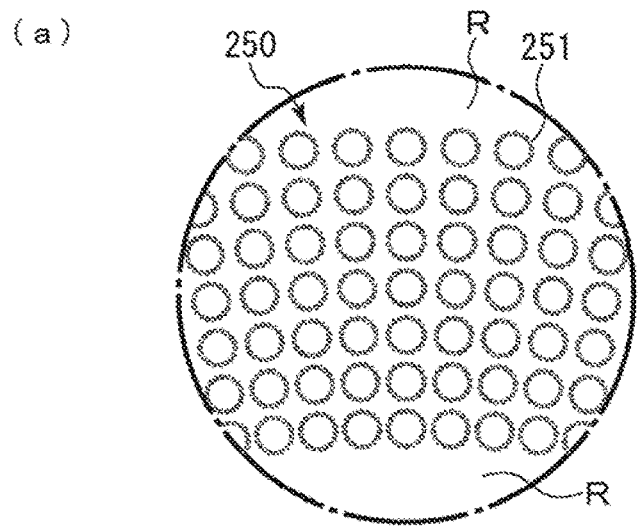
(b)
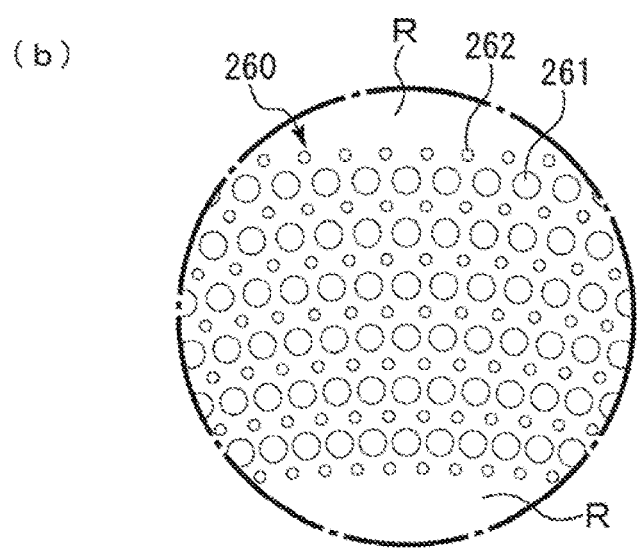
(c)
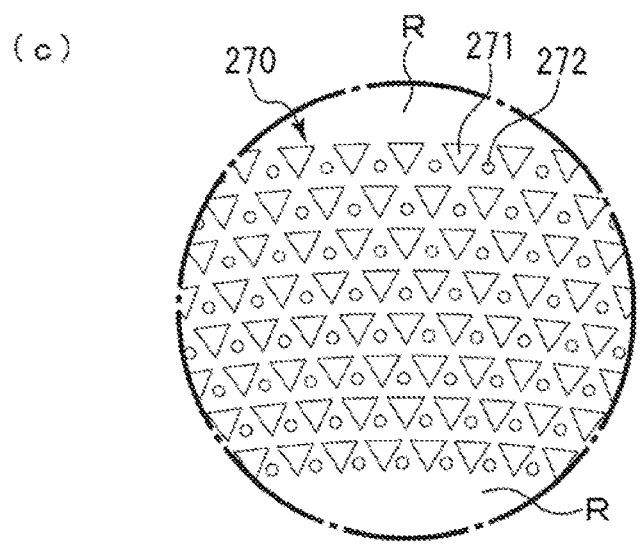

SLIDING COMPONENT

CROSS-REFERENCE TO RELATED APPLICATIONS

This application is the U.S. National Phase under 35 U.S.C. § 371 of International Application PCT/JP2018/036782, filed Oct. 2, 2018, which claims priority to Japanese Patent Application No. JP2017-193251, filed Oct. 3, 2017. The International Application was published under PCT Article 21(2) in a language other than English.

TECHNICAL FIELD

The present invention relates to a sliding component suitable, for example, as a mechanical seal, a sliding bearing, and other sliding units. In particular, the present invention relates to a sliding component such as a seal ring or a bearing that requires reduction of friction by interposing a fluid between sliding faces, and prevention of leakage of the fluid from the sliding faces.

BACKGROUND ART

In a mechanical seal serving as an example of a sliding component, sliding friction during rotation is required to be reduced to the extreme while maintaining a sealing property. As a method of reducing friction, provision of grooves that generate dynamic pressure on a sliding face, or arrangement of dimples on a sliding face is known.

Conventionally, a mechanical seal including a rotating seal ring and a stationary seal ring in which a dynamic pressure generation groove is provided on a sliding face of the mechanical seal is known. For example, a fluid introduction groove communicating with an outer peripheral surface and an extremely shallow dynamic pressure generation groove communicating with the fluid introduction groove are provided on a sliding face of the rotating seal ring of the mechanical seal, and when the rotating seal ring is rotated, a fluid introduced to the fluid introduction groove is pulled into the extremely shallow dynamic pressure generation groove by viscosity of the fluid, so that positive pressure is generated by the wedge effect. Thereby, a slight gap is formed between the sliding faces and a state can be brought into a fluid lubricating state, so that sliding friction during rotation is reduced (for example, see Patent Document 1).

Conventionally, in order to improve a lubricating property, random arrangement of plural dimples is also known. For example, plural dimples are randomly arranged on an inner wall of a cylinder of a rotary compressor and a leading end surface and both side end surfaces of a sliding vane (for example, see Patent Document 2).

CITATION LIST

Patent Documents

Patent Document 1: JP 5-60247 A
Patent Document 2: JP 2001-221179 A

SUMMARY OF THE INVENTION

Problem to be Solved by the Invention

However, in the invention described in Patent Document 1, there is a need for processing the groove in order to form the dynamic pressure generation mechanism, and the processing takes time and effort.

The invention described in Patent Document 2 is just to randomly arrange the plural dimples in order to improve the lubricating property, and a performance of the dimples is not sufficiently drawn out.

An object of the present invention is to provide sliding components with which a dynamic pressure generation mechanism can be easily formed and a lubricating performance and a sealing performance are furthermore improved.

Means for Solving Problem

In order to solve the foregoing problems, sliding components according to a first aspect of the present invention are a pair of sliding components having sliding faces that slide with respect to each other, characterized in that at least the sliding face on one side includes at least one dimple group formed by plural dimples, and the dimple group includes at least one opening portion arranged in the sliding face.

According to the first aspect, in addition to a sealing effect and a fluid lubricating effect of the dimples themselves, the sealing effect and the fluid lubricating effect are exerted by suctioning a fluid from the opening portion as the whole dimple group. Thus, it is possible to furthermore improve a lubricating performance and a sealing performance. Each one of the dimples forming the dimple group holds the fluid. Thus, it is possible to prevent that the sliding faces are brought into a poorly lubricated state even at the time of low speed rotation where a fluid lubricating film is not easily formed.

The fluid lubricating effect is an effect of improving a lubricating property by letting the fluid flow from the sealed fluid side to the sliding face, and the sealing effect is also called as the pumping effect, which is an effect of improving a sealing property by suctioning the fluid from the leakage side to the sliding face.

The sliding components according to a second aspect of the present invention are characterized in that the dimple group is a pseudo flow passage partitioned by a land portion excluding the opening portion.

According to the second aspect, even when each one of the dimples is separated by the land portion, the fluid flows in the dimple group along the shape of the dimple group, the dimple group functions as the pseudo flow passage, and exerts a dynamic pressure generation effect by being partitioned by the land portion. The dimple group can furthermore improve the lubricating effect and the sealing effect by a synergy effect of a fluid lubricating operation and a pumping operation exerted by the individual dimples and the dynamic pressure generation effect exerted by the dimple group as a whole.

The sliding components according to a third aspect of the present invention are characterized in that the dimple group extends in the circumferential direction from the opening portion on the sealed fluid side.

According to the third aspect, the fluid flowing in from the opening portion on the sealed fluid side flows along the dimple group and is blocked by the land portion, functioning as a dynamic pressure generation mechanism that generates dynamic pressure. Thereby, in addition to the pumping operation and the fluid lubricating operation of the individual dimples themselves, the dimple group that functions as the pseudo flow passage takes in the fluid from the sealed fluid side and exerts a fluid lubricating function. Thus, it is possible to furthermore improve the fluid lubricating effect.

The sliding components according to a fourth aspect of the present invention are characterized in that the dimple group extends in the circumferential direction from the opening portion on the leakage side.

According to the fourth aspect, in addition to the pumping operation and the fluid lubricating operation of the dimples themselves, the dimple group that functions as the pseudo flow passage takes in the fluid from the leakage side and exerts the pumping effect. Thus, it is possible to furthermore improve a sealing function.

The sliding components according to a fifth aspect of the present invention are characterized in that the sliding face on one side includes at least one pair of the dimple groups extending in the same direction, and the dimple group on one side is arranged on the sealed fluid side and communicates with the opening portion on the sealed fluid side, and the dimple group on the other side is arranged on the leakage side and communicates with the opening portion on the leakage side.

According to the fifth aspect, by respectively arranging the dimple groups on the sealed fluid side and the leakage side, it is possible to exert the sealing effect and the fluid lubricating effect over the entire sliding faces.

The sliding components according to a sixth aspect of the present invention are characterized in that the pair of dimple groups is connected.

According to the sixth aspect, by connecting the dimple group on the sealed fluid side and the dimple group on the leakage side, the dimple groups that function as the pseudo flow passage can supply the fluid to the sliding faces over the entire length in the radial direction. Thus, it is possible to prevent that the sliding faces are brought into a poorly lubricated state even at the time of low speed where a fluid film is not easily formed.

The sliding components according to a seventh aspect of the present invention are characterized to be characterized in that the sliding face on one side includes at least one pair of the dimple groups extending in the opposite directions to each other from the opening portion on the sealed fluid side.

According to the seventh aspect, the dimple groups that function as the pseudo flow passage can exert the sealing effect and the fluid lubricating effect irrespective of the rotation direction.

The sliding components according to an eighth aspect of the present invention are characterized in that the sliding face on one side includes at least one pair of the dimple groups extending in the opposite directions to each other from the opening portion on the sealed fluid side, and the dimple group on one side is arranged on the sealed fluid side, and the dimple group on the other side is arranged on the leakage side.

According to the eighth aspect, the dimple group on one side exerts the fluid lubricating effect, and the dimple group on the other side exerts the sealing effect. Thus, it is possible to provide the sliding components having performances contradictory to each other.

The sliding components according to a ninth aspect of the present invention are characterized in that the sliding face on one side includes at least one dynamic pressure generation mechanism having the dimple group communicating with the opening portion on the sealed fluid side, the dimple group being arranged on the sealed fluid side, a fluid introduction groove open at the leakage side peripheral edge, and a dynamic pressure generation groove arranged on the leakage side, the dynamic pressure generation groove communicating with the fluid introduction groove and extending in the same direction as the dimple group.

According to the ninth aspect, by the dynamic pressure generation function formed by the dimple group that functions as the pseudo flow passage and the groove portion, a gap between the two sliding faces that slide with respect to each other is furthermore increased. Thus, it is possible to improve the fluid lubricating operation.

The sliding components according to a tenth aspect of the present invention are characterized in that the sliding face on one side includes at least one dynamic pressure generation mechanism having at least one fluid introduction portion open at the leakage side peripheral edge, the dimple group communicating with the fluid introduction portion and extending in the circumferential direction, and an island shaped groove portion arranged in the dimple group.

According to the tenth aspect, the fluid taken into the fluid introduction portion is supplied into the dimple group and the island shaped groove portion. Thus, it is possible to prevent that the sliding faces are brought into a poorly lubricated state even at the time of low speed rotation where a fluid lubricating film is not easily formed.

The sliding components according to an eleventh aspect of the present invention are characterized in that the dimple group has a substantially rectangular shape.

According to the eleventh aspect, even when the individual dimples are separated by the land portion, by continuing the dimples and forming into a rectangular shape, it is possible to form a rectangular pseudo flow passage.

The sliding components according to a twelfth aspect of the present invention are characterized in that the dimple group has a spiral shape.

According to the twelfth aspect, even when the individual dimples are separated by the land portion, by continuing the dimples and forming into a spiral shape, it is possible to form a spiral pseudo flow passage.

The sliding components according to a thirteenth aspect of the present invention are characterized in that the dimple group has a herringbone shape.

According to the thirteenth aspect, even when the individual dimples are separated by the land portion, by continuing the dimples and forming into a herringbone shape, it is possible to form a herringbone pseudo flow passage.

The sliding components according to a fourteenth aspect of the present invention are characterized in that the dimple group is an aligned dimple group formed by arranging and aligning the plural dimples.

According to the fourteenth aspect, by arranging and aligning the dimples, it is possible to easily form the pseudo flow passage having a desired shape.

The sliding components according to a fifteenth aspect of the present invention are characterized in that the aligned dimple group is formed by arranging sub dimple groups in which the dimples are aligned based on a predetermined rule at predetermined pitches.

According to the fifteenth aspect, even when the individual dimples are separated by the land portion, the dimples arranged based on the predetermined rule function as the pseudo flow passage. Thus, it is possible to let the fluid flow based on the predetermined rule.

The sliding components according to a sixteenth aspect of the present invention are characterized in that the dimple group is a random dimple group formed by randomly arranging the plural dimples.

According to the sixteenth aspect, even when the individual dimples are separated by the land portion, the randomly arranged dimple group suctions the fluid from the leakage side and supplies the fluid whose pressure is evenly increased to the entire sliding faces. Thus, it is possible to exert the fluid lubricating effect.

BRIEF DESCRIPTION OF THE DRAWINGS

FIG. 13 is a W-W arrow view of FIG. 1, showing a modified example of the sliding component according to the fifth embodiment of the present invention: FIG. 13A shows that the inner diameter side of a herringbone dimple group is closed; and FIG. 13B shows that the outer diameter side of the herringbone dimple group is closed.

FIG. 14 is a W-W arrow view of FIG. 1, showing a modified example of a sliding component according to a sixth embodiment of the present invention: FIG. 14A shows a spiral dimple group; FIG. 14B shows that the outer diameter side of the spiral dimple group is closed; and FIG. 14C shows an example in which semi-ellipsoidal dimple groups are arranged.

FIG. 16A shows that dimples are arranged at substantially equal intervals; FIG. 16B shows that the dimples are arranged and aligned densely on the radially inside and sparsely on the radially outside; and FIG. 16C shows an example in which the dimples are arranged and aligned sparsely and densely in the circumferential direction.

FIG. 17 is enlargement of the A portion of FIG. 2, showing a modified example of the aligned dimple group according to the present invention: FIG. 17A shows that sub dimple groups in which dimples are arranged along a sin curve in the circumferential direction are arranged at predetermined pitches in the radial direction; and FIG. 17B shows that sub dimple groups in which dimples are arranged along a sin curve in the radial direction are arranged at predetermined pitches in the circumferential direction.

FIG. 18 is enlargement of the A portion of FIG. 2, showing another modified example of the aligned dimple group according to the present invention: FIG. 18A shows that sub dimple groups in which dimples are arranged in a circular shape are arranged and aligned; FIG. 18B shows that dimples having different size are arranged and aligned; and FIG. 18C shows that dimples having different shapes are arranged and aligned.

DESCRIPTION OF EMBODIMENTS

Hereinafter, with reference to the drawings, modes for carrying out the present invention will be described as examples based on embodiments. However, the dimensions, the materials, the shapes, the relative arrangements, etc. of constituent components described in the embodiments are not intended to limit the scope of the present invention only to them unless otherwise described explicitly.

First Embodiment

With reference to FIGS. 1 to 6, sliding components according to a first embodiment of the present invention will be described. In the following embodiment, as an example, a mechanical seal that is an example of the sliding components will be described. However, the present invention is not limited to this but for example can also be utilized as a sliding component of a bearing that slides with a rotating shaft while sealing lubricating oil on the axially one side of a cylindrical sliding face. The outer peripheral side of the sliding component forming the mechanical seal will be described as the high pressure fluid side (sealed fluid side), and the inner peripheral side as the low pressure fluid side (leakage side).

Figure 1:
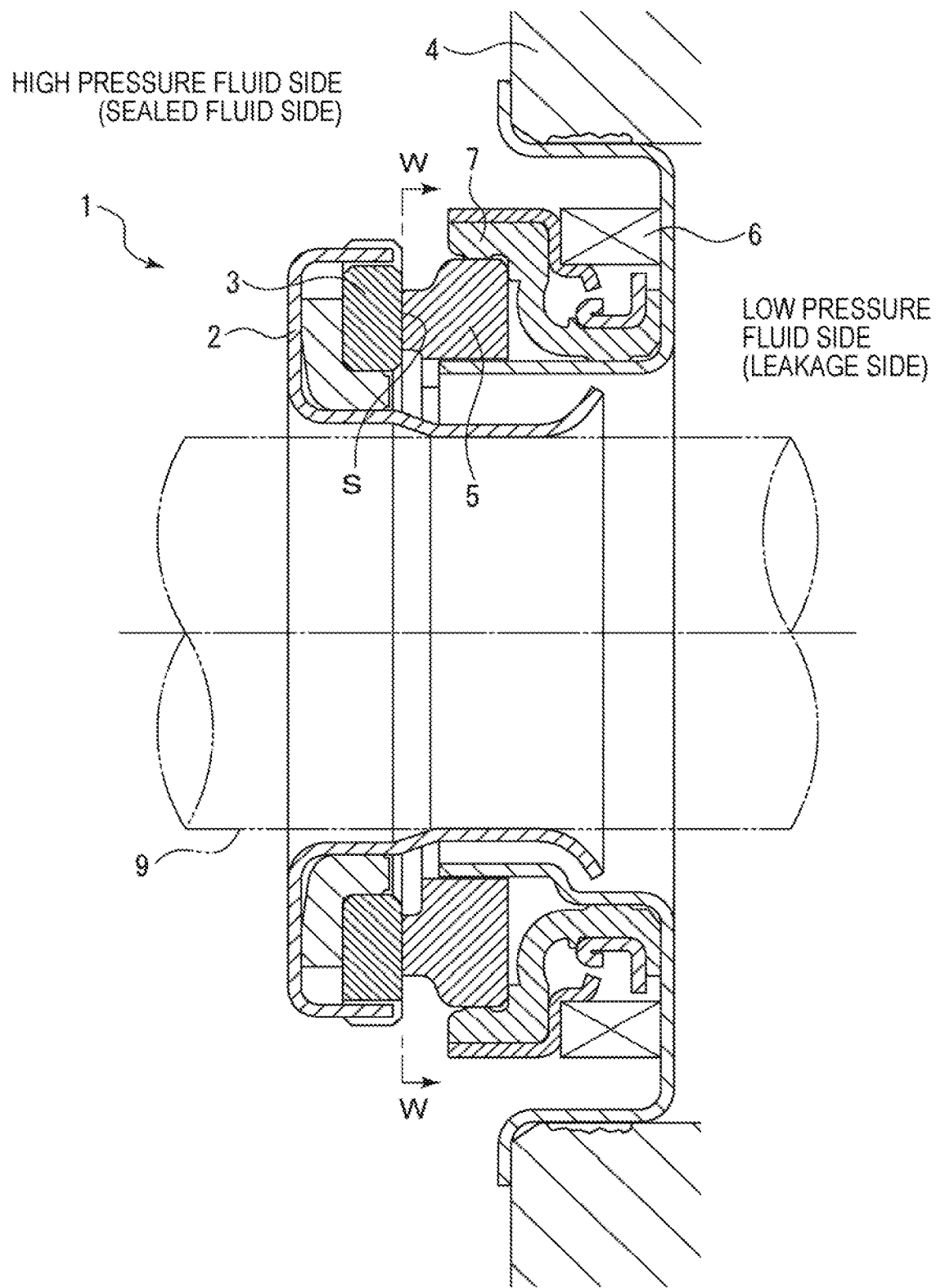
FIG. 1 is a vertically sectional view showing an example in which a sliding component according to the present invention is applied to a mechanical seal.

FIG. 1 is a vertically sectional view showing an example of a mechanical seal 1, which is an inside mechanical seal in the form of sealing a sealed fluid on the high pressure fluid side to leak from the outer periphery of sliding faces toward the inner periphery. The mechanical seal is provided with an annular rotating side seal ring 3 serving as one sliding component provided across a sleeve 2 on the side of a rotating shaft 9 in a state where the rotating side seal ring is rotatable integrally with this rotating shaft 9, and an annular stationary side seal ring 5 serving as the other sliding component provided in a housing 4 in a non-rotating state and an axially movable state. With a coiled wave spring 6 and a bellows 7 axially biasing the stationary side seal ring 5, the seal rings slide in close contact with each other at sliding faces S. That is, this mechanical seal prevents an outflow of the sealed fluid from the outer peripheral side to the inner peripheral side at the sliding faces S of the rotating side seal ring 3 and the stationary side seal ring 5.

FIG. 1 shows a case where width of the sliding face of the rotating side seal ring 3 is greater than width of the sliding face of the stationary side seal ring 5. However, the present invention is not limited to this but is also applicable to the opposite case as a matter of course.

The material of the rotating side seal ring 3 and the stationary side seal ring 5 is selected from silicon carbide (SiC) excellent in wear resistance, carbon excellent in self-lubricity, etc. For example, both the seal rings can be made of SiC or the rotating side seal ring 3 of SiC and the stationary side seal ring 5 of carbon can be combined. Dimples are arranged on at least any one of the sliding faces of the rotating side seal ring 3 and the stationary side seal ring 5 that slide with respect to each other.

In the present invention, the "dimples" are dents surrounded by the flat sliding face S (hereinafter, it may be referred to as the "land portion"), each of the dents having a bottom portion recessed from the sliding face S, and the shape thereof is not particularly limited. For example, the shape of an opening portion of the dent includes a circle, a triangle, an ellipse, an oval, or a rectangle. The sectional shape of the dent also includes various shapes such as a cone, a truncated cone, a bowl shape, or a square. The diameter of the opening portion of the dimple is 1 μm to 300 μm, preferably 5 μm to 100 μm, and the depth is 50 nm to 100 μm, preferably, 500 nm to 60 μm.

By arranging the plural dimples on the sliding face, it is possible to improve contradictory functions of lubricating and sealing. A mechanism to improve a lubricating function and a sealing function is as follows.

When the opposing sliding face is relatively moved, the fluid is suctioned into hole portions of the dimples formed on the sliding face by viscosity of the fluid, and negative pressure is generated in a part on the upstream side of the hole portions, and positive pressure is generated in a part on the downstream side by the wedge effect. At that time, in the negative pressure part of the hole portions on the upstream side, a liquid film is broken and a cavity is formed, so that large negative pressure is cancelled. As a result, the dimples have positive pressure as a whole and a load capacity is generated, and hence the sliding face S is brought up. When the sliding face S is brought up, a gap between the two sliding faces that slide with respect to each other is increased, and the fluid flows into the sliding faces S, so that the lubricating function is obtained.

The pressure of the fluid suctioned into the dimples is boosted in the dimples and the fluid is discharged from the dimples. That is, the suction of the fluid into the dimples and the discharge of the fluid whose pressure is boosted from the dimples are consecutively performed. When the large numbers of dimples are arranged, the fluid suctioned into and discharged from the dimples arranged on the inner peripheral side of the sliding face is consecutively and repeatedly suctioned into and discharged from the dimples arranged on the further outer diameter side. Thus, the sealing function in which the fluid is gradually delivered from the inner diameter side to the outer diameter side is obtained.

When the dimples separated by a land portion are brought close and formed as a dimple group having a predetermined shape, the fluid flowing in the dimple group is continuously and repeatedly suctioned and discharged by the dimples. Thus, the fluid flows along the shape of the dimple group. That is, even when the individual dimples forming the dimple group are separated by the land portion, the whole dimple group functions as if the dimple group is an independent flow passage (hereinafter, referred to as the "pseudo flow passage"). The present invention is to improve the sealing function and the fluid lubricating function of the sliding component by utilizing a pumping operation and a fluid lubricating operation of each one of the dimples and a dynamic pressure function of the dimple group that functions as the pseudo flow passage.

In the present embodiment, a case where plural dimples are arranged on the sliding face S of the stationary side seal ring 5 will be described. In this case, dimples may be provided or not provided in the rotating side seal ring 3.

Figure 2:
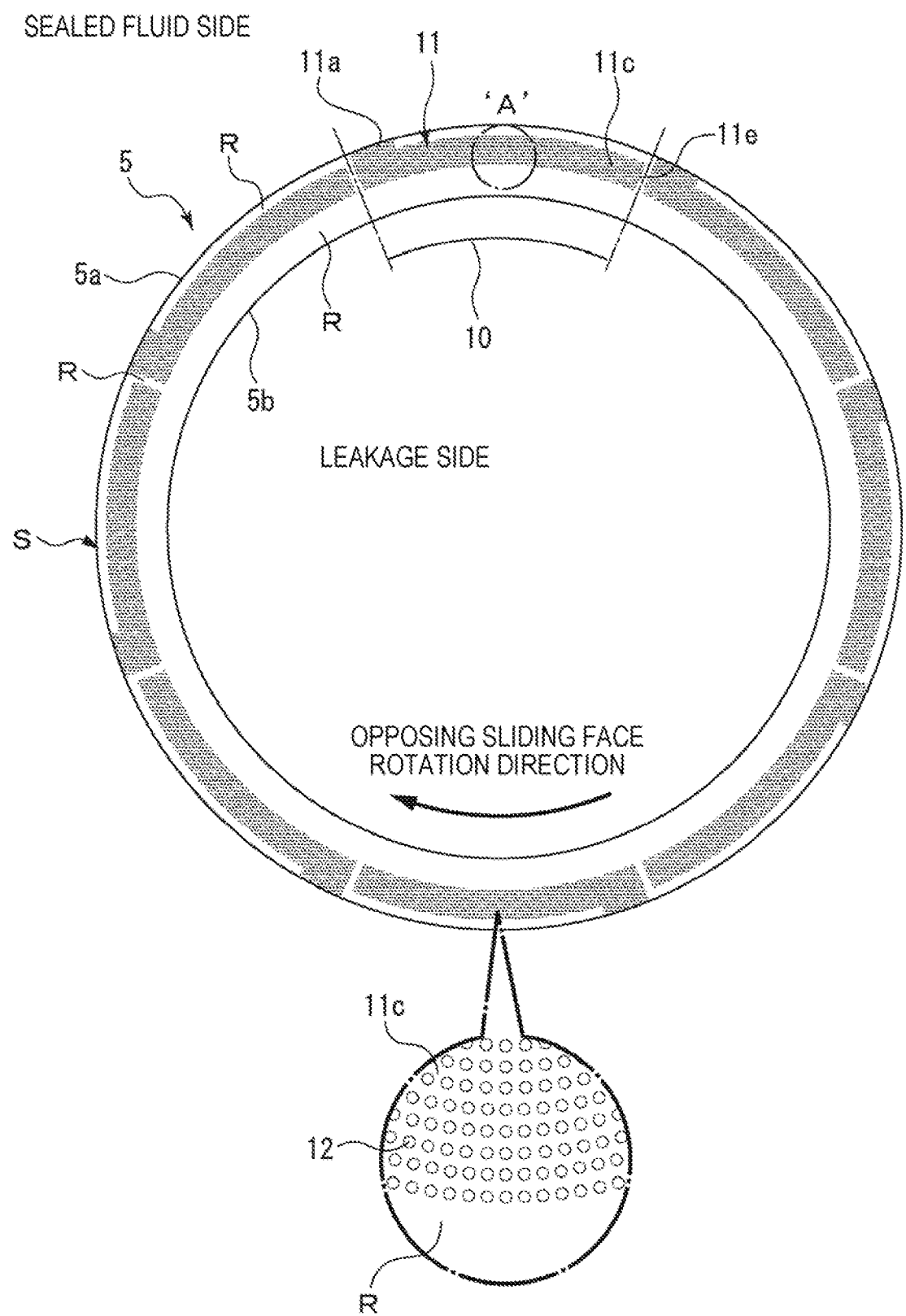
FIG. 2 is a W-W arrow view of FIG. 1, showing an example of a sliding face of a sliding component according to a first embodiment of the present invention.

As shown in FIG. 2, the sliding face S has plural regions 10 partitioned by the land portion, and each of the regions 10 includes a dimple group 11. In FIG. 2, the number of the regions 10 is eight. However, the number is not limited to this but only required to be one or more. The upper limit number is not particularly limited as long as the number is within a range where the dimple group can be arranged on the sliding face S.

The dimple group 11 is a collective body of plural dimples 12. An outer peripheral edge of the dimple group 11 is partitioned by a land portion R excluding an opening portion 11a, and the outer peripheral edge of the dimple group 11 is formed in a curved and substantially rectangular band shaped body. Specifically, the dimple group 11 includes the opening portion 11a provided in a sealed fluid side peripheral edge 5a (outer peripheral surface) of the sliding face S at one end, a band shaped body 11c communicating with the opening portion 11a and extending in the circumferential direction on the rotation direction lagging side, and a dead end portion 11e closed by the land portion R at the other end of the dimple group 11, that is, an end portion of the band shaped body 11c. The density of the dimples arranged in the dimple group is from 30% to 70%, preferably from 40% to 60%. The circumferential length of the band shaped body 11c is formed to be larger than the radial width of the band shaped body and larger than the opening width of the opening portion 11a.

When the opposing sliding face is rotated in the direction shown in FIG. 2, the dimple group 11 can take in a sealed fluid from the opening portion 11a communicating with the sealed fluid side peripheral edge 5a. At this time, the fluid taken into the dimple group 11 flows along the dimple group 11 while being repeatedly suctioned and discharged by the dimples 12, and is blocked in the dead end portion 11e, so that positive pressure is generated. Thereby, the gap between the two sliding faces that slide with respect to each other is increased, and the fluid having a lubricating property flows into the sliding faces S, so that a fluid lubricating operation is obtained. In such a way, even when the dimples 12 of the dimple group 11 are separated by the land portion R, the fluid flows along the dimple group 11 and positive pressure is generated in the dead end portion 11e. Thus, the dimple group 11 functions as the pseudo flow passage having a positive pressure generation function.

Conventionally, there is a need for processing a groove in order to form a dynamic pressure generation mechanism such as a Rayleigh step. However, with the dimple group 11 of the present invention, there is no need for processing a groove. In the dimple group 11, each one of the dimples 12 exerts the pumping operation and the fluid lubricating operation, and the dimple group 11 that functions as the pseudo flow passage exerts a dynamic pressure generation function as a whole. Thus, it is possible to furthermore improve a lubricating performance and a sealing performance by a synergy effect of the both. Each one of the dimples forming the dimple group holds the fluid. Thus, it is possible to prevent that the sliding faces are brought into a poorly lubricated state even at the time of low speed rotation where a fluid lubricating film is not easily formed.

Figure 3:
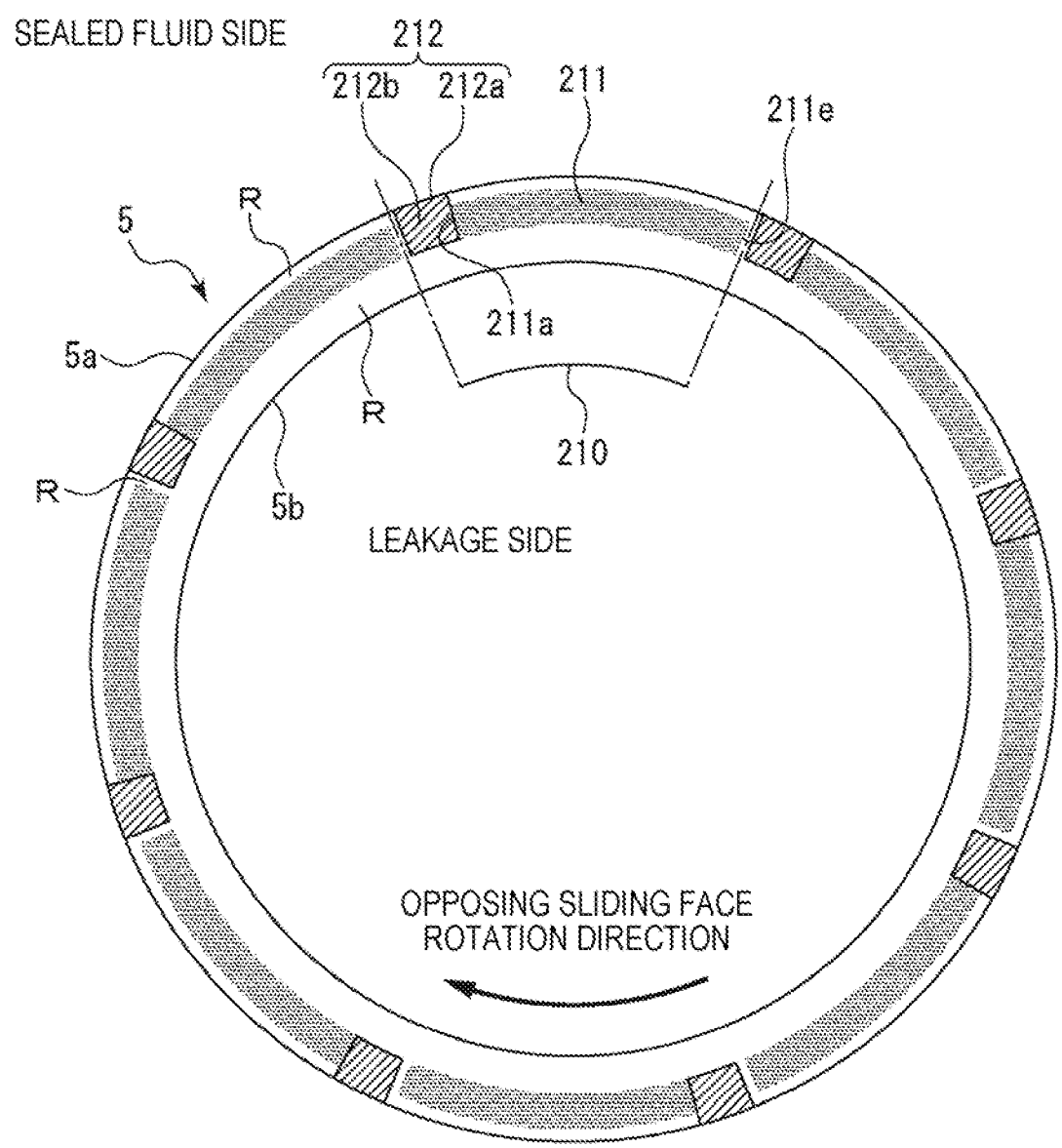
FIG. 3 is a W-W arrow view of FIG. 1, showing a modified example of the sliding component according to the first embodiment of the present invention.

In FIG. 2, the opening portion 11a of the dimple group 11 is provided in the sealed fluid side peripheral edge 5a (outer peripheral surface) of the sliding face S. However, the present invention is not limited to this but the dimple group may have an opening portion in the sliding face. For example, as shown in FIG. 3, the sliding face S has plural regions 210 partitioned by the land portion, and each of the regions 210 includes a fluid introduction portion 212 and a dimple group 211 communicating with the fluid introduction portion 212. The fluid introduction portion 212 has an opening portion 212a in the sealed fluid side peripheral edge 5a and a fluid introduction groove 212b communicating with the opening portion 212a, the fluid introduction groove being formed by a shallow groove. The dimple group 211 has an opening portion 211a communicating with the fluid introduction portion 212 at one end, and a dead end portion 211e surrounded by the land portion at the other end. The flow passage sectional area of the fluid introduction portion 212 formed by the shallow groove can be formed to be larger than that of the dimple group. Thus, the fluid introduction portion 212 can efficiently take in a large amount of the fluid. By efficiently taking in the fluid on the sealed fluid side from the opening portion 211a communicating with the fluid introduction portion 212, the dimple group 211 can further improve the fluid lubricating function. Since the fluid can be supplied from the fluid introduction portion 212 and the dimple group to the sliding face S, it is possible to prevent that the sliding faces are brought into a poorly lubricated state even at the time of low speed rotation where a fluid lubricating film is not easily formed. The shallow groove is only required to be a groove having the depth of about 1 μm to about 1 mm, preferably the depth of about 1 μm to about 100 μm, and having the sectional shape with which the fluid can be introduced with low resistance such as a rectangle, a semi-circle, a V shape, or a U shape.

Further, in FIG. 2, the opening portion 11a of the dimple group 11 is provided in the sealed fluid side peripheral edge 5a (outer peripheral surface) of the sliding face S. However, the present invention is not limited to this but an opening portion may be provided in a leakage side peripheral edge 5b (inner peripheral surface) of the sliding face S. Thereby, the dimple group communicating with the leakage side suctions the fluid from the leakage side and functions as a dimple group excellent in a sealing effect. In this case as well, the fluid introduction portion 212 of FIG. 3 can be utilized. That is, by providing a fluid introduction portion formed by a shallow groove communicating with the leakage side and providing communication between the fluid introduction portion and the opening portion of the dimple group, it is possible to improve the sealing effect and a fluid lubricating effect of the dimple group.

Figure 4:
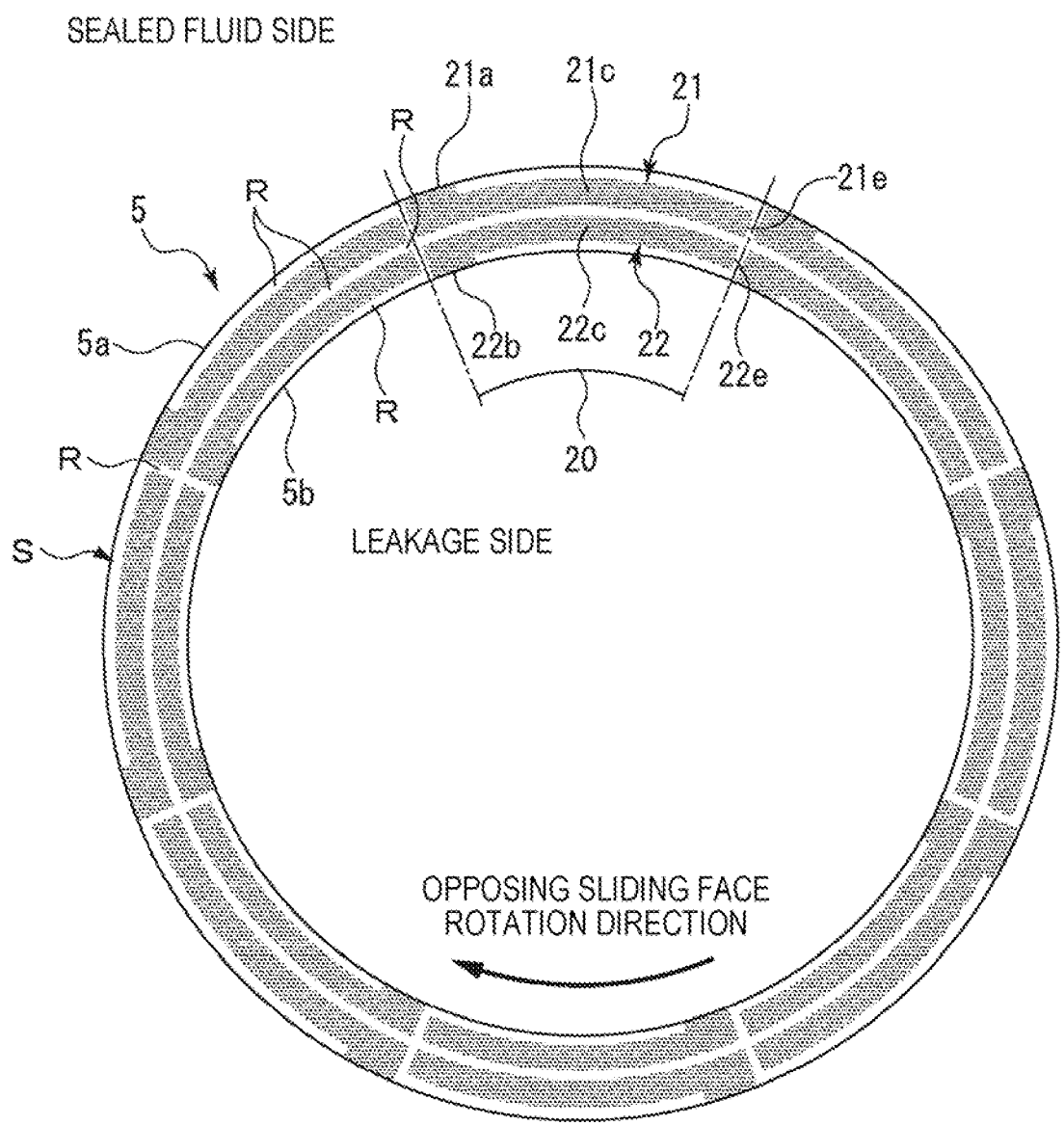
FIG. 4 is a W-W arrow view of FIG. 1, showing a different modified example of the sliding component according to the first embodiment of the present invention.

FIG. 4 is a modified example of the first embodiment. The sliding face S has regions 20 partitioned by the land portion, and each of the regions 20 includes two dynamic pressure generation mechanisms of a dimple group 21 arranged on the sealed fluid side and a dimple group 22 arranged on the leakage side. The dimple group 21 includes an opening portion 21a provided in the sealed fluid side peripheral edge 5a (outer peripheral surface) of the sliding face S at one end, a band shaped body 21c communicating with the opening portion 21a and extending in the circumferential direction on the rotation direction lagging side, and a dead end portion 21e closed by the land portion R at the other end of the dimple group 21, that is, an end portion of the band shaped body 21c. The dimple group 22 includes an opening portion 22b provided in the leakage side peripheral edge 5b of the sliding face S at one end, a band shaped body 22c communicating with the opening portion 22b and extending in the circumferential direction on the rotation direction lagging side, and a dead end portion 22e closed by the land portion R at the other end of the dimple group 22, that is, an end portion of the band shaped body 22c.

When the opposing sliding face is rotated in the direction shown in FIG. 4, the dimple group 21 arranged on the sealed fluid side suctions the sealed fluid from the opening portion 21a. The suctioned sealed-side fluid flows along the band shaped body 21c of the dimple group 21 and is blocked in the dead end portion 21e, so that positive pressure is generated by the dimple group 21 as a whole and the fluid lubricating effect is exerted. The dimple group 22 arranged on the leakage side suctions the leakage-side fluid from the opening portion 22b and exerts the sealing function. Further, the suctioned leakage-side fluid flows along the band shaped body of the dimple group 22 and is blocked in the dead end portion 22e, so that the fluid lubricating effect is exerted by the dimple group 22 as a whole. In such a way, by respectively arranging the dimple groups 21, 22 on the sealed fluid side and the leakage side, it is possible to furthermore improve not only the fluid lubricating effect but also the sealing effect.

Figure 5:
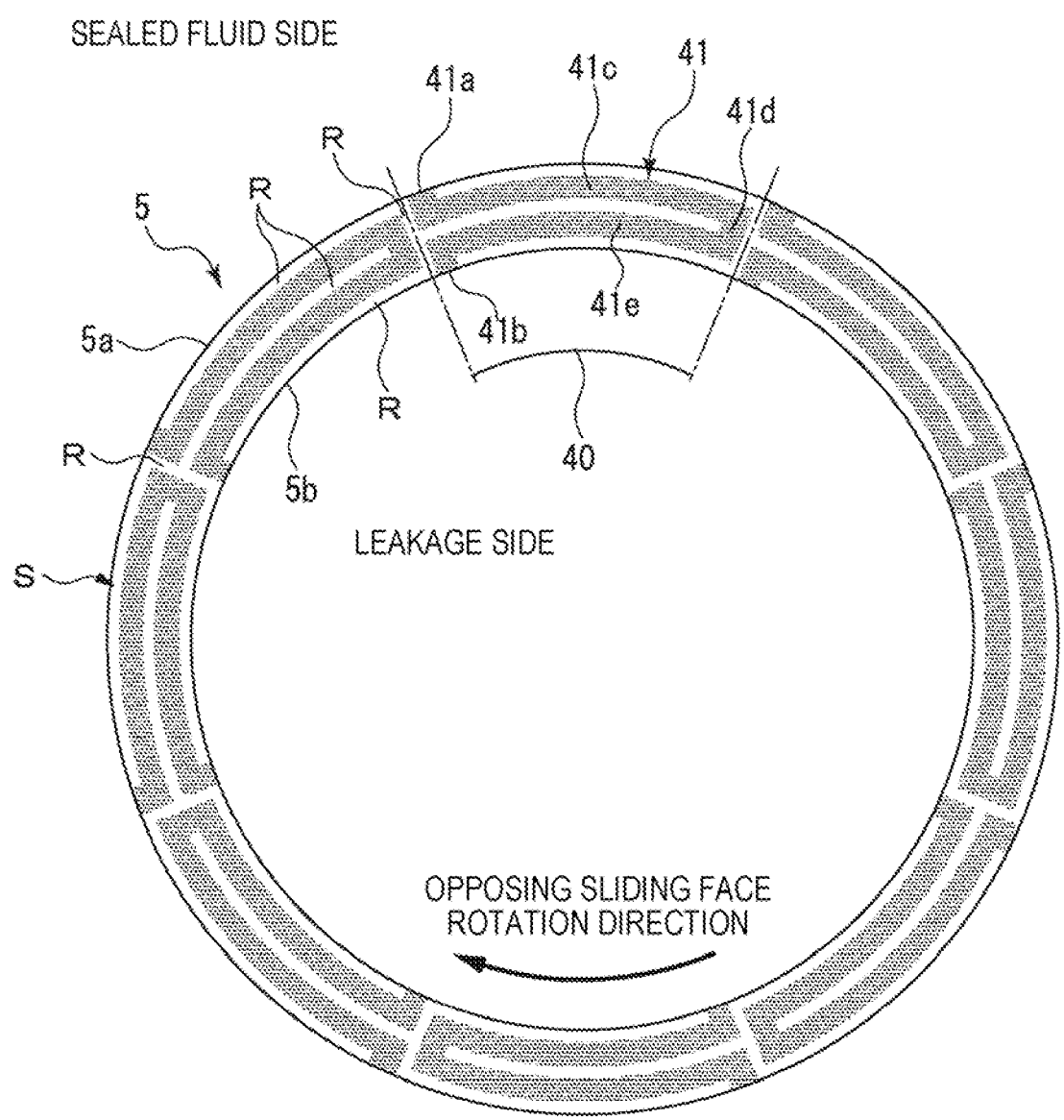
FIG. 5 is a W-W arrow view of FIG. 1, showing another modified example of the sliding component according to the first embodiment of the present invention.

FIG. 5 is a further modified example of the first embodiment. In the example of FIG. 4, the dimple group 21 and the dimple group 22 are separated on the sealed fluid side and on the leakage side. However, in the example of FIG. 5, the sliding face S has plural regions 40 partitioned by the land portion, and each of the regions 40 includes an integrated dimple group 41. That is, the dimple group 41 includes a band shaped body 41c arranged on the sealed fluid side of the sliding face S, the band shaped body communicating with an opening portion 41a which is provided in the sealed fluid side peripheral edge 5a and extending on the rotation direction lagging side, a band shaped body 41e arranged on the leakage side of the sliding face S, the band shaped body communicating with an opening portion 41b which is provided in the leakage side peripheral edge 5b and extending on the rotation direction lagging side, and a connection portion 41d providing communication between an end portion of the band shaped body 41c and an end portion of the band shaped body 41e.

When the opposing sliding face is rotated in the direction shown in FIG. 5, the dimple group 41 suctions the fluid respectively from the opening portion 41a and the opening portion 41b. The suctioned fluid flows along the band shaped bodies 41c, 41e and joins together in the connection portion 41d, so that positive pressure is generated. Thus, it is possible to reliably exert the fluid lubricating function even in a center portion of the sliding face S. Since the dimple group 41 having the connection portion 41d can supply the fluid to the sliding face S over the entire length in the radial direction, it is possible to prevent that the sliding faces S are brought into a poorly lubricated state even at the time of low speed rotation where a fluid lubricating film is not easily formed.

Figure 6:
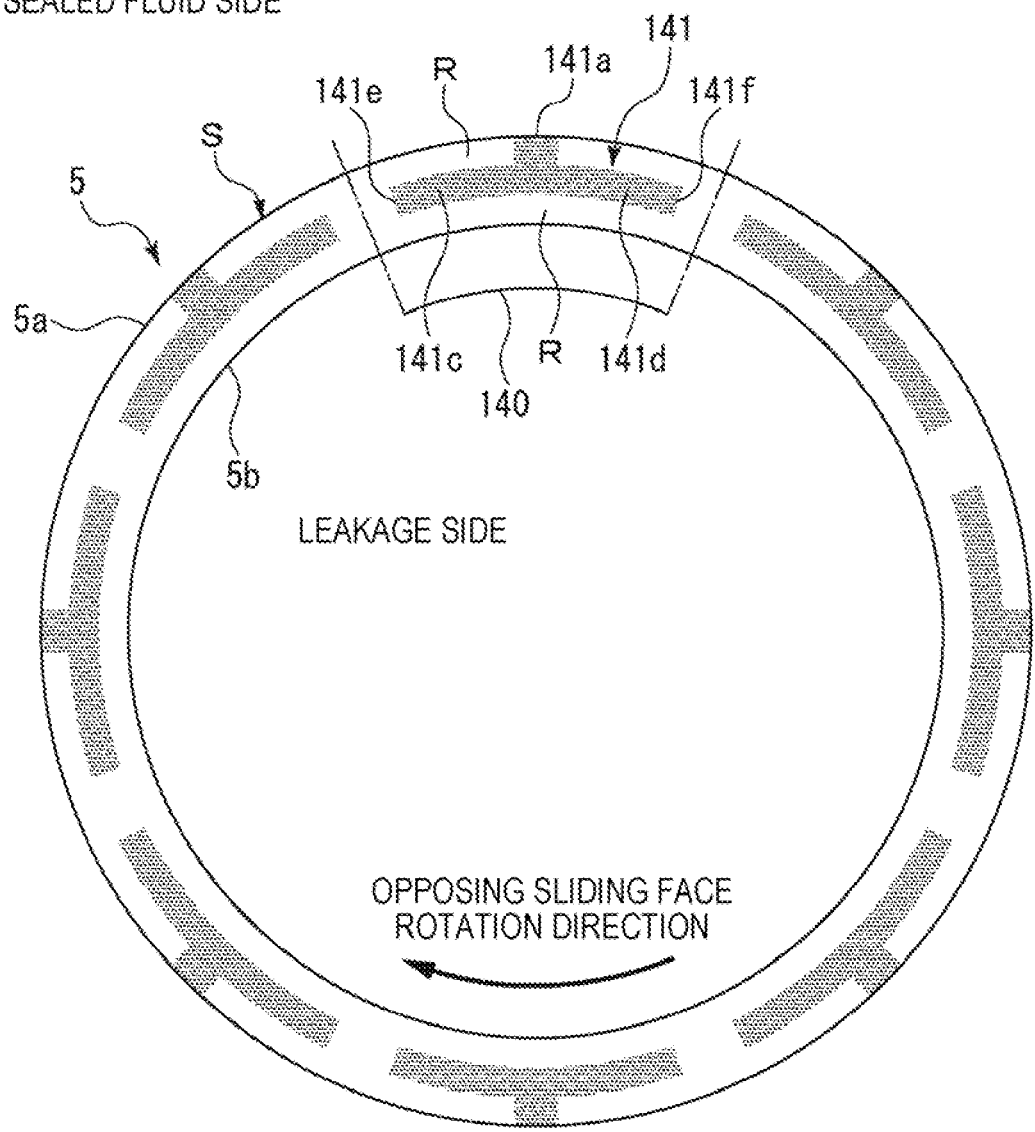
FIG. 6 is a W-W arrow view of FIG. 1, showing further another modified example of the sliding component according to the first embodiment of the present invention.

FIG. 6 is a further modified example of the first embodiment. In the example of FIG. 6, the sliding face S has plural regions 140 partitioned by the land portion, and each of the regions 140 includes a dimple group 141. The dimple group 141 includes an opening portion 141a on the sealed fluid side, a pair of band shaped bodies 141c and 141d extending in the opposite directions to each other from the opening portion 141a, and dead end portions 141e, 141f that close an end portion of the band shaped body 141c and an end portion of the band shaped body 141d. In the dimple group 141, the band shaped bodies 141c and 141d are arranged substantially symmetrically across the opening portion 141a. Thus, irrespective of the rotation direction, the fluid taken in from the opening portion 141a flows in the dimple group 141, so that dynamic pressure is generated. With the dimple group 141, irrespective of the rotation direction, each one of the dimples 12 exerts the pumping operation and the fluid lubricating operation, and the dimple group 141 that functions as the pseudo flow passage exerts the dynamic pressure generation function as a whole. Thus, it is possible to furthermore improve the lubricating performance and the sealing performance by the synergy effect of the both.

With the dimple group 11, 21, 41, 141, 211 of the first embodiment, the individual dimples 12 exert the pumping operation and the fluid lubricating operation, and the dimple group 11, 21, 41, 141, 211 exerts a sealing operation and the fluid lubricating effect as a whole. Thus, it is possible to furthermore improve the lubricating effect and the sealing effect by the synergy effect of the both. Even when the dimples forming the dimple group are separated by the land portion, the whole dimple group functions as if the dimple group is an independent flow passage. Thus, without processing a groove as in a conventional Rayleigh step, it is possible to easily process a flow passage with which the sealing operation and the fluid lubricating operation can be exerted by the collective body of the small dimples 12. Further, since each one of the dimples forming the dimple group holds the fluid, it is possible to prevent that the sliding faces are brought into a poorly lubricated state even at the time of low speed rotation where a fluid lubricating film is not easily formed.

In the examples of FIGS. 4 to 6, it is also possible to provide an opening portion of a dimple group in the sliding face by utilizing the fluid introduction portion 212 of FIG. 3. That is, by providing a fluid introduction portion formed by a shallow groove communicating with the sealed fluid side or the leakage side and providing communication between the fluid introduction portion and the opening portion of the dimple group, it is possible to improve the sealing function and the fluid lubricating function.

Second Embodiment

Next, sliding components according to a second embodiment will be described with reference to FIGS. 7 and 8. Although the dimple group of the first embodiment is the pseudo flow passage that functions as a positive pressure generation mechanism, a dimple group of the second embodiment is different from the first embodiment in a point that the dimple group has a pseudo flow passage that functions as a negative pressure generation mechanism. The same constituent parts as the constituent parts shown in the above embodiment will be given the same reference signs and the description will not be repeated.

Figure 7:
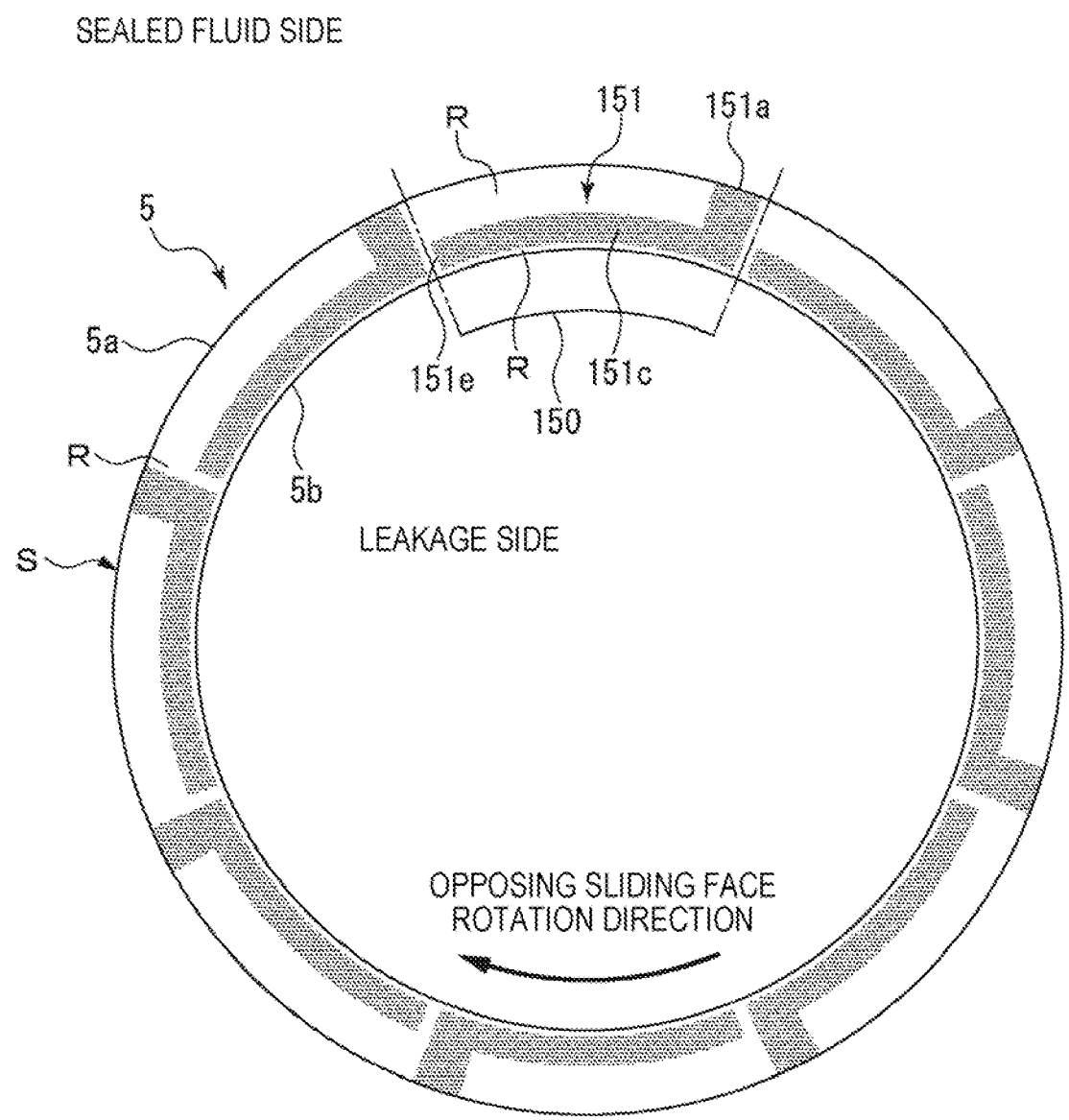
FIG. 7 is a W-W arrow view of FIG. 1, showing an example of a sliding face of a sliding component according to a second embodiment of the present invention.

As shown in FIG. 7, a sliding face S has plural regions 150 partitioned by a land portion, and each of the regions 150 includes a dimple group 151. In FIG. 7, the number of the regions is eight. However, the number is not limited to this but only required to be one or more. The upper limit number is not particularly limited as long as the number is within a range where the dimple group can be arranged on the sliding face S.

The dimple group 151 is a collective body of plural dimples 12. An outer peripheral edge of the dimple group 151 is partitioned by the land portion R excluding an opening portion 151a, and the outer peripheral edge of the dimple group 151 is formed in a curved and substantially rectangular band shaped body. Specifically, the dimple group 151 includes the opening portion 151a provided in a sealed fluid side peripheral edge 5a (outer peripheral surface) of the sliding face S at one end, a band shaped body 151c communicating with the opening portion 151a and extending in the circumferential direction (on the rotation direction forward side), and a dead end portion 151e closed by the land portion R at the other end of the dimple group 151, that is, an end portion of the band shaped body 151c. The band shaped body 151c is arranged at a position closer to a leakage side peripheral edge 5b as a whole.

When the opposing sliding face is rotated in the direction shown in FIG. 7, a fluid flowing into the dimple group 151 from the dead end portion 151e side by viscosity of the fluid flows along the dimple group 151 and is released from the opening portion 151a without being blocked. Thus, the dimple group 151 has negative pressure as a whole. That is, the dimple group 151 functions as a pseudo flow passage having a negative pressure generation function. Therefore, by arranging the dimple group 151 having the negative pressure generation mechanism in the vicinity of the leakage side peripheral edge 5b, negative pressure in the dimple group 151 is utilized and the fluid is suctioned to the sliding face S from the leakage side, so that leakage can be reduced. Thus, it is possible to improve the sealing effect.

Figure 8:
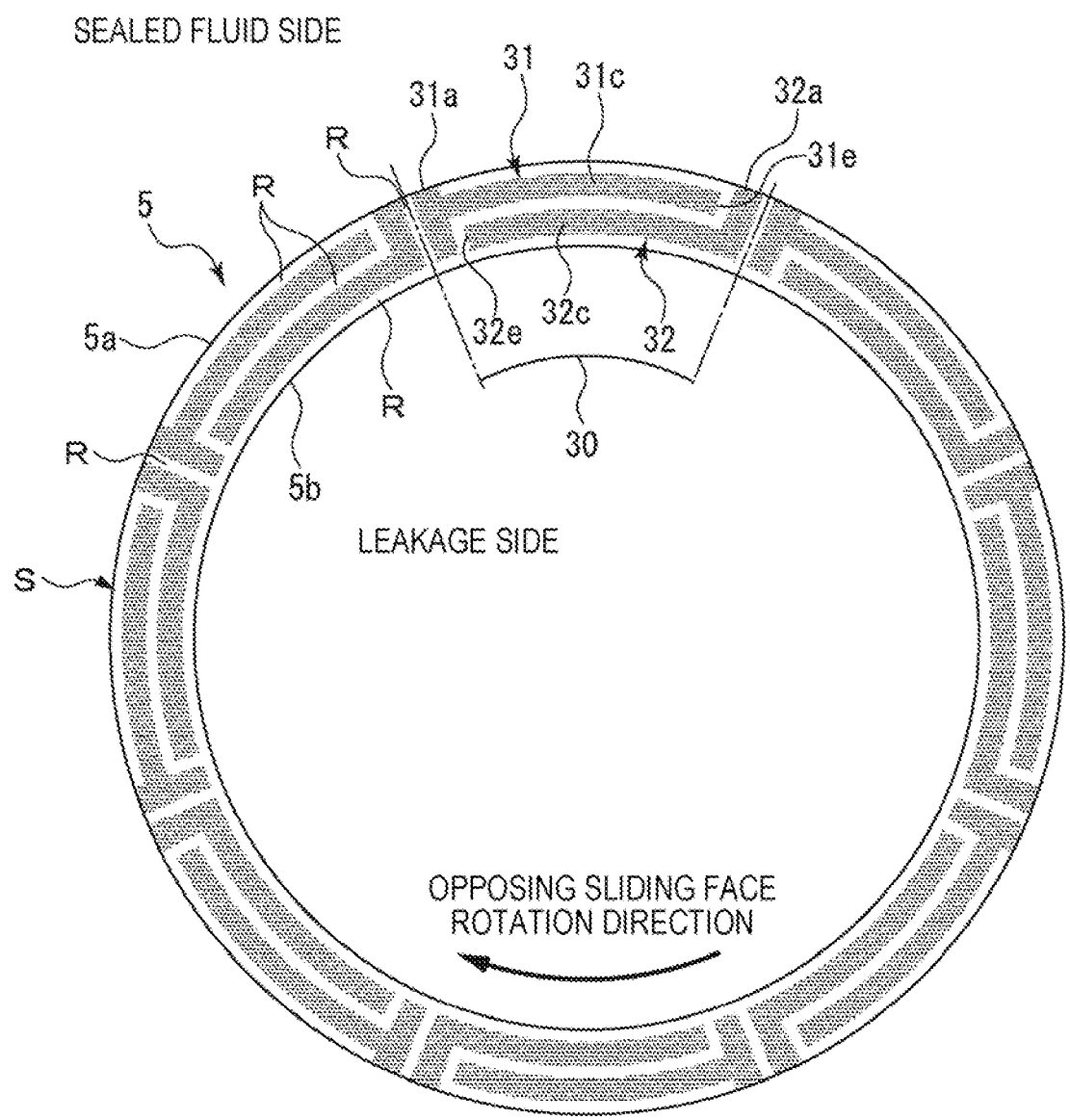
FIG. 8 is a W-W arrow view of FIG. 1, showing a modified example of the sliding component according to the second embodiment of the present invention.

FIG. 8 is a modified example of the second embodiment. The sliding face S has plural regions 30 partitioned by the land portion, and each of the regions 30 includes a dimple group 31 arranged on the sealed fluid side and a dimple group 32 arranged on the leakage side. The dimple group 31 includes an opening portion 31a provided in the sealed fluid side peripheral edge 5a, a band shaped body 31c communicating with the opening portion 31a and extending on the rotation direction lagging side, and a dead end portion 31e closed by the land portion R at an end portion of the band shaped body 31c. The dimple group 32 includes an opening portion 32a provided in the sealed fluid side peripheral edge 5a, a band shaped body 32c communicating with the opening portion 32a and extending in the opposite direction to the band shaped body 31c (on the rotation direction forward side), and a dead end portion 32e closed by the land portion R at an end portion of the band shaped body 32c.

When the opposing sliding face is rotated in the direction shown in FIG. 8, the dimple group 31 functions as a pseudo flow passage where the fluid flowing in from the opening portion 31a flows along the dimple group 31 and is blocked in the dead end portion 31e, so that positive pressure is generated, and exerts the fluid lubricating effect. Meanwhile, in the dimple group 32, the fluid flowing into the dimple group 32 from the dead end portion 32e side by the viscosity of the fluid is not blocked but released from the opening portion 32a. Thus, the dimple group 32 functions as a pseudo flow passage where negative pressure is generated as a whole, suctions the fluid to the sliding face S from the leakage side, and exerts the sealing operation.

In such a way, by arranging the dimple group 31 serving as the positive pressure generation mechanism on the sealed fluid side of the sliding face S and the dimple group 32 serving as the negative pressure generation mechanism on the leakage side, it is possible to improve different performances of the fluid lubricating performance and the sealing performance. Further, without processing a groove as in a conventional Rayleigh step, it is possible to easily form a pseudo flow passage having the positive pressure generation function and the negative pressure generation function by the collective body of the small dimples 12.

In the examples of FIGS. 7 and 8, it is also possible to provide an opening portion of a dimple group in the sliding face by utilizing the fluid introduction portion of FIG. 3. That is, by providing a fluid introduction portion formed by a shallow groove communicating with the sealed fluid side or the leakage side and providing communication between the fluid introduction portion and the opening portion of the dimple group, it is possible to improve the sealing function and the fluid lubricating function.

Third Embodiment

Next, sliding components according to a third embodiment will be described with reference to FIGS. 9 and 10. Although the sliding components of the first and second embodiments are formed by only the dimple groups, the sliding components of the third embodiment include a pseudo flow passage formed by a dimple group and a flow passage formed by a shallow groove. The same constituent parts as the constituent parts shown in the above embodiments will be given the same reference signs and the description will not be repeated.

Figure 9:
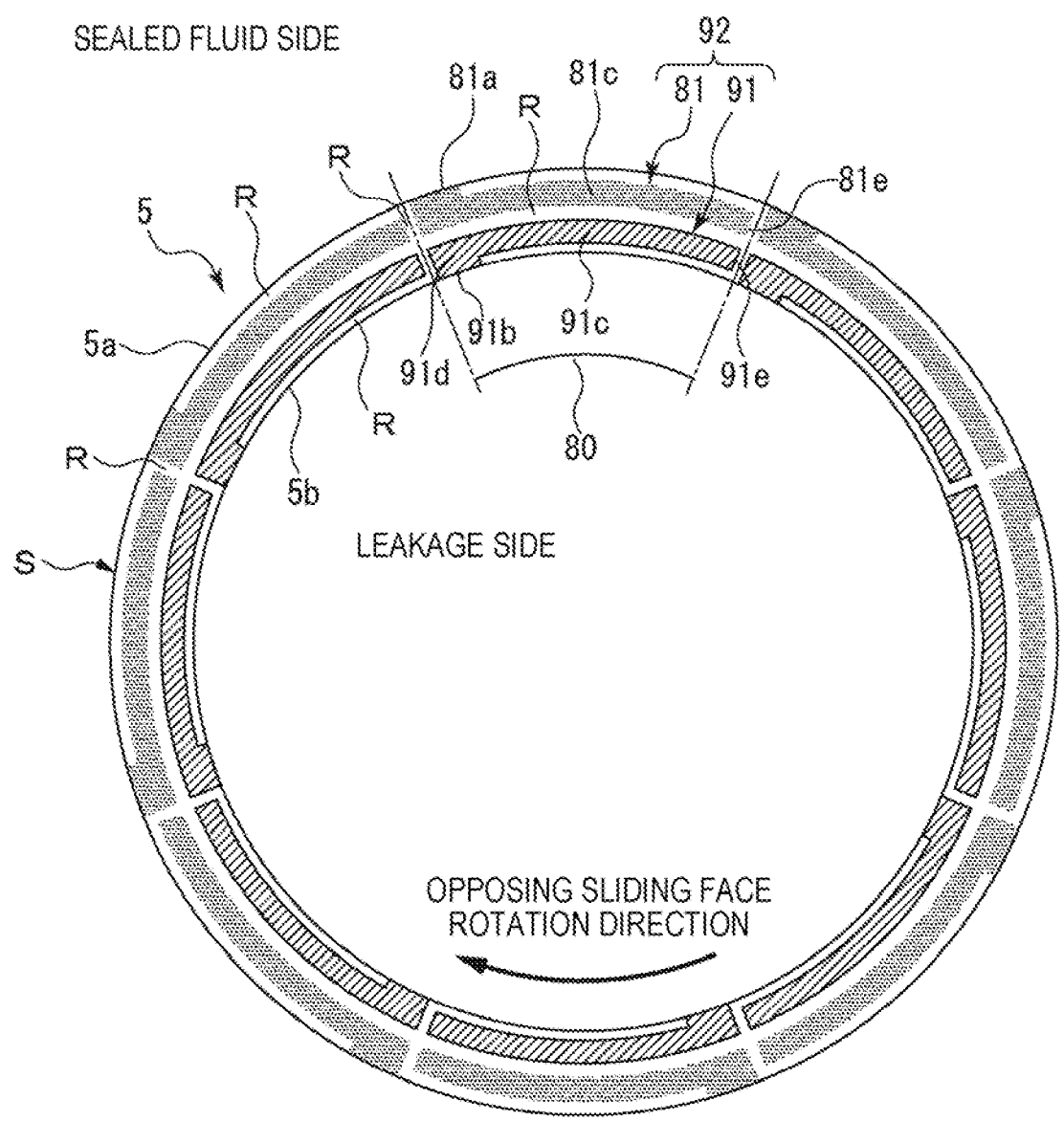
FIG. 9 is a W-W arrow view of FIG. 1, showing an example of a sliding face of a sliding component according to a third embodiment of the present invention.

As shown in FIG. 9, a sliding face S has plural regions 80 partitioned by a land portion. Each of the regions 80 includes a dynamic pressure generation mechanism 92 formed by a dimple group 81 which is arranged on the sealed fluid side, the dimple group functioning as the pseudo flow passage, and a dynamic pressure generation groove 91 which is formed by the shallow groove arranged on the leakage side. The dimple group 81 includes an opening portion 81*a* provided in a sealed fluid side peripheral edge 5*a* (outer peripheral surface) of the sliding face S at one end, a band shaped body 81*c* communicating with the opening portion 81*a* and extending in the circumferential direction on the rotation direction lagging side, and a dead end portion 81*e* closed by the land portion R at the other end of the dimple group 81, that is, an end portion of the band shaped body 81*c*. The dynamic pressure generation groove 91 includes a fluid introduction groove 91*d* communicating with an opening portion 91*b* which is provided in a leakage side peripheral edge 5*b*, the fluid introduction groove being formed by a shallow groove, at one end, a groove portion 91*c* communicating with the fluid introduction groove 91*d* and extending in the same direction as the band shaped body 81*c*, the groove portion being formed by a shallow groove, and a dead end portion 91*e* closed by the land portion R at the other end of the dynamic pressure generation groove 91, that is, an end portion of the groove portion 91*c*. The land portion R is provided over the entire circumference between the dimple group 81 and the dynamic pressure generation groove 91, and the dimple group 81 and the dynamic pressure generation groove 91 are separated by the land portion R. Thereby, it is possible to ensure a sealing property even at the time of stoppage.

When the opposing sliding face is rotated in the direction shown in FIG. 9, the dynamic pressure generation groove 91 efficiently takes in the fluid from the opening portion 91*b*. The fluid taken into the dynamic pressure generation groove 91 is moved in the groove portion 91*c* in the circumferential direction and blocked in the dead end portion 91*e*, so that positive pressure is generated. Thereby, a gap between the two sliding faces that slide with respect to each other is enlarged and the fluid flows into the sliding face S. Thus, it is possible to obtain the fluid lubricating operation. In the dimple group 81, the fluid taken in from the opening portion 81*a* flows along the band shaped body 81*c* and is blocked in the dead end portion 81*e* and pressure is increased, so that the fluid lubricating operation is also exerted. Further, since the flow passage sectional area of the dynamic pressure generation groove 91 formed by the shallow groove is large, a flow rate flowing in the dynamic pressure generation groove 91 is more than a flow rate flowing in the dimple group 81. The fluid whose pressure is increased in the dynamic pressure generation groove 91 is also supplied to the dimple group 81, and the fluid lubricating function of the whole dimple group 81 is further improved. Thereby, it is possible to furthermore improve the fluid lubricating operation by positive pressure generated by the dynamic pressure generation groove 91 and the dimple group 81, and it is also possible to prevent that the sliding faces are brought into a poorly lubricated state even at the time of low speed rotation where a fluid lubricating film is not easily formed.

In the example of FIG. 9, by separating the dimple group 81 and the dynamic pressure generation groove 91 over the entire circumference by the land portion R, the sealing property at the time of stoppage is ensured. Meanwhile, in the example of FIG. 10, the sliding face S has regions 230 partitioned by the land portion, and each of the regions 230 includes a dynamic pressure generation mechanism 242 formed by a dimple group 231 which is arranged on the sealed fluid side, the dimple group functioning as the pseudo flow passage, and a dynamic pressure generation groove 241 which is formed by the shallow groove arranged on the leakage side. There is no land portion R between the dimple group 231 and the dynamic pressure generation groove 241, and the dimple group 231 and the dynamic pressure generation groove 241 communicate with each other.

Figure 10:
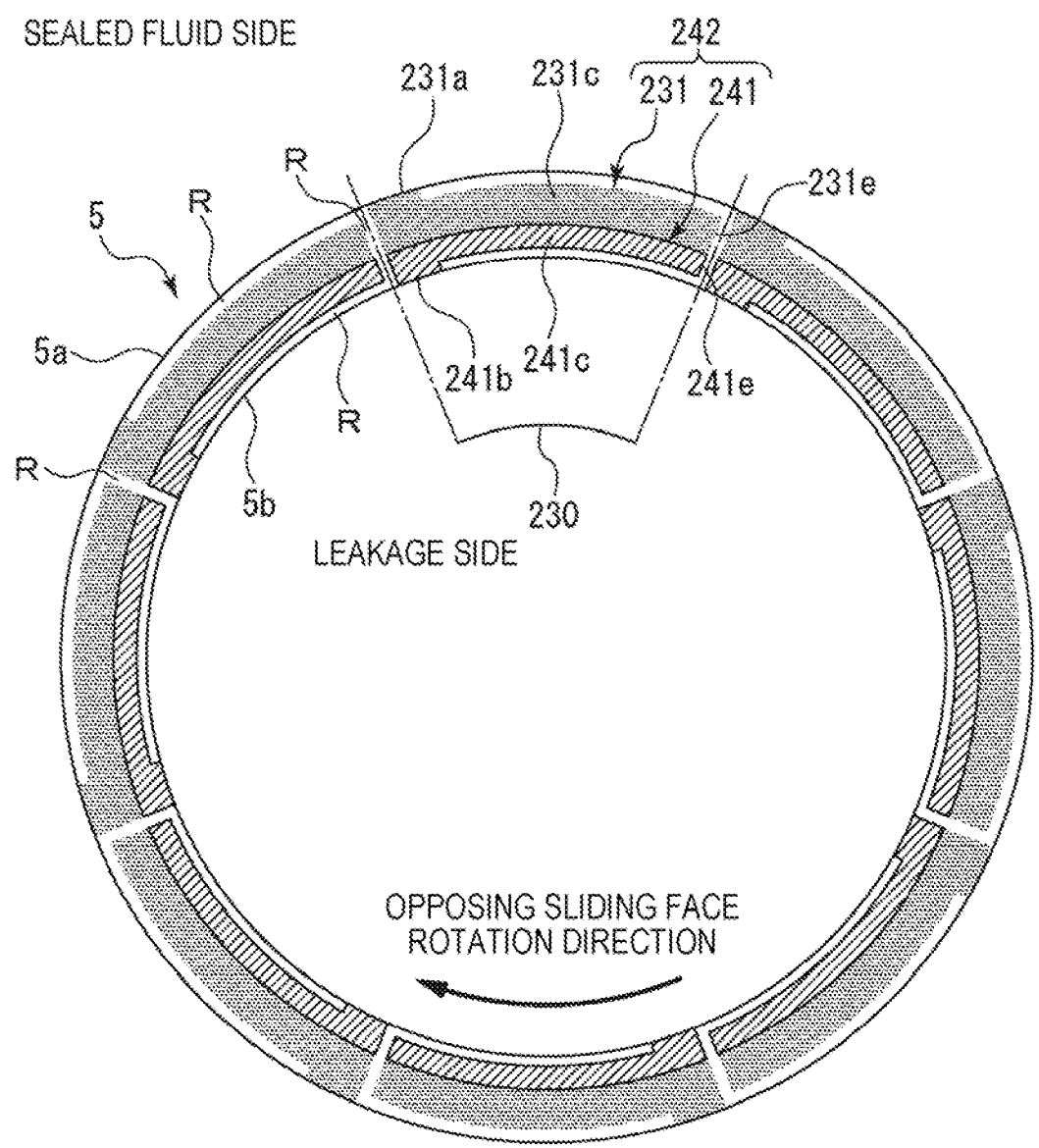
FIG. 10 is a W-W arrow view of FIG. 1, showing a modified example of the sliding component according to the third embodiment of the present invention.

When the opposing sliding face is rotated in the direction shown in FIG. 10, in the dynamic pressure generation groove 241, the fluid taken into a groove portion 241*c* from an opening portion 241*b* is moved in the circumferential direction and blocked in a dead end portion 241*e*, so that positive pressure is generated and the fluid lubricating operation is obtained. In the dimple group 231, the fluid taken in from an opening portion 231*a* flows along a band shaped body 231*c* and is blocked in a dead end portion 231*e* and pressure is increased, so that the fluid lubricating operation is also exerted. Since the flow passage sectional area of the dynamic pressure generation groove 241 formed by the shallow groove is larger than the flow passage sectional area of the dimple group 231, an amount of the fluid taken in from the opening portion 241*b* of the dynamic pressure generation groove 241 is more than an amount of the fluid taken in from the opening portion 231*a* of the dimple group 231. Therefore, even when the dimple group 231 and the dynamic pressure generation groove 241 communicate with each other, it is possible to prevent that the fluid flows to the leakage side to the leakage-side opening portion 241*b* from the opening portion 231*a* on the sealed fluid side.

During stoppage, the sliding face S of a rotating side seal ring 3 and the sliding face S of a stationary side seal ring 5 are closely attached to each other. Thus, a flow between the dimples 12 forming the dimple group 231 is shut off by the land portion R surrounding the dimples 12. That is, even when the dimple group 231 and the dynamic pressure generation groove 241 communicate with each other, the flow in the dimple group 231 is shut off during stoppage. Thus, it is possible to prevent stoppage leakage where the fluid on the sealed fluid side flows to the leakage side. The dimple group of the present invention is the pseudo flow passage with which the fluid can flow along the shape of the dimple group when the rotating side seal ring 3 and the stationary side seal ring 5 slide with respect to each other, and the flow in the dimple group can be shut off during stoppage.

Fourth Embodiment

Next, sliding components according to a fourth embodiment will be described with reference to FIG. 11. As well as the third embodiment, the fourth embodiment includes a dynamic pressure generation mechanism formed by a pseudo flow passage which is formed by a dimple group and a dynamic pressure generation groove which is formed by a shallow groove. The same constituent parts as the constituent parts shown in the above embodiments will be given the same reference signs and the description will not be repeated.

Figure 11:
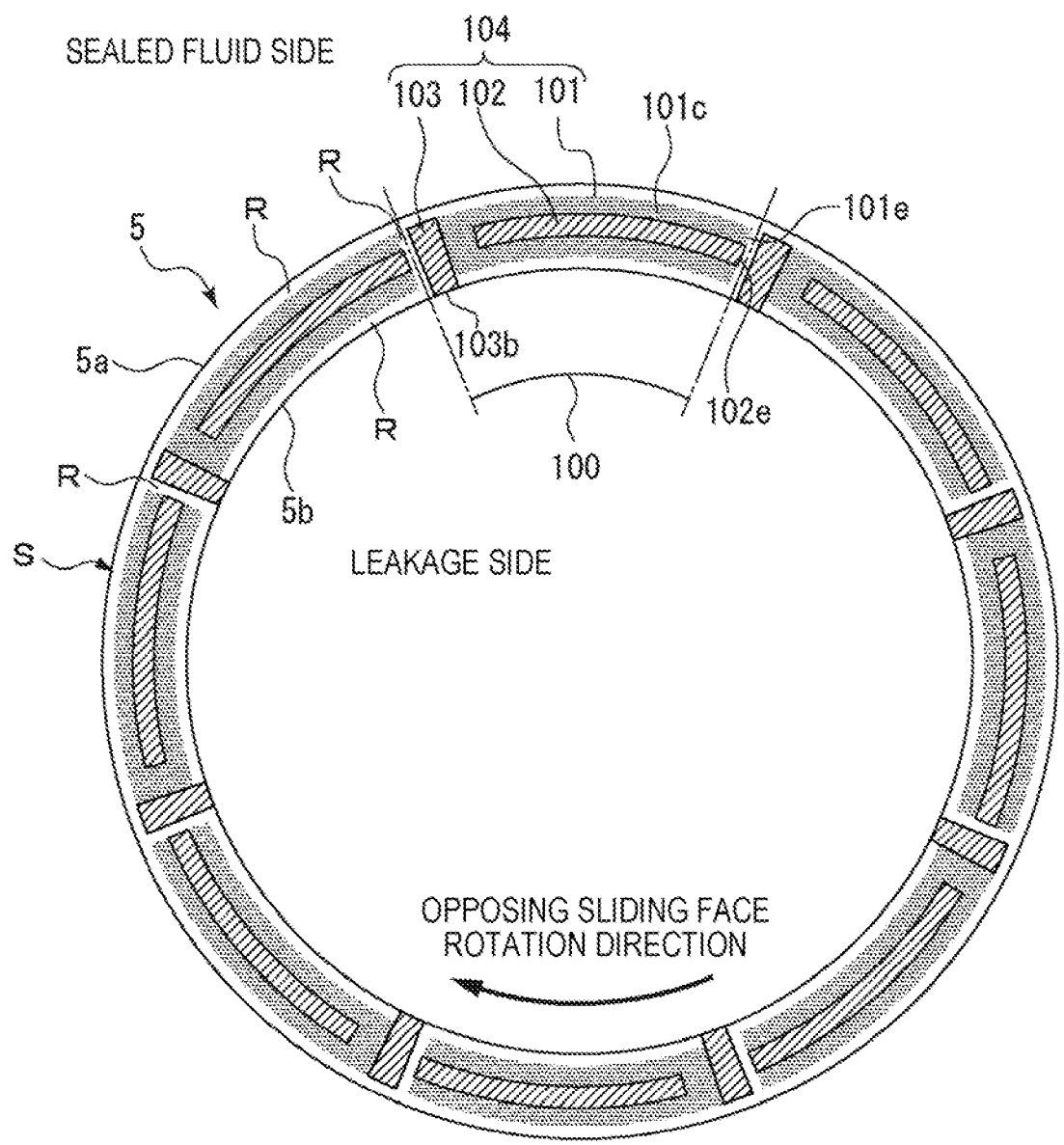
FIG. 11 is a W-W arrow view of FIG. 1, showing an example of a sliding face of a sliding component according to a fourth embodiment of the present invention.

As shown in FIG. 11, a sliding face S has plural regions 100 partitioned by a land portion. Each of the regions 100 includes a dynamic pressure generation mechanism 104 having a fluid introduction groove 103, a dimple group 101, and an island shaped groove portion 102. The fluid introduction groove 103 has an opening portion 103b open at a leakage side peripheral edge and communicates with the leakage side. The dimple group 101 includes a band shaped body 101c whose one end communicating with the fluid introduction groove 103, the band shaped body extending on the rotation direction lagging side, and a dead end portion 101e closed by the land portion R at the other end of the dimple group 101, that is, an end portion of the band shaped body 101c. The island shaped groove portion 102 is surrounded by the dimple group 101 and formed in an island shape. The dynamic pressure generation mechanism 104 is surrounded by the land portion R excluding the opening portion 103b.

When the opposing sliding face is rotated in the direction shown in FIG. 11, the fluid introduction groove 103 formed by the shallow groove efficiently takes in a fluid from the opening portion 103b. The fluid taken into the fluid introduction groove 103 is supplied into the dimple group 101 and the island shaped groove portion 102. Thus, it is possible to prevent that the sliding faces S are brought into a poorly lubricated state even at the time of low speed rotation where a fluid lubricating film is not easily formed. The fluid flowing in the dimple group 101 and the island shaped groove portion 102 is blocked in the dead end portions 101e, 102e, so that positive pressure is generated. Thereby, a gap between the two sliding faces that slide with respect to each other is increased. Thus, it is possible to obtain the fluid lubricating effect.

Fifth Embodiment

Next, sliding components according to a fifth embodiment will be described with reference to FIGS. 12 and 13. The dimple groups of the first to fourth embodiments are formed in a substantially rectangular shape. Meanwhile, in place of the rectangular dimple groups, a pseudo flow passage with which the sealing effect and the fluid lubricating effect are further efficiently exerted is formed. Specifically, the fifth embodiment is different from the above embodiments in a point that plural dimples 12 are formed into a herringbone pseudo flow passage. The same constituent parts as the constituent parts shown in the above embodiments will be given the same reference signs and the description will not be repeated.

Figure 12:
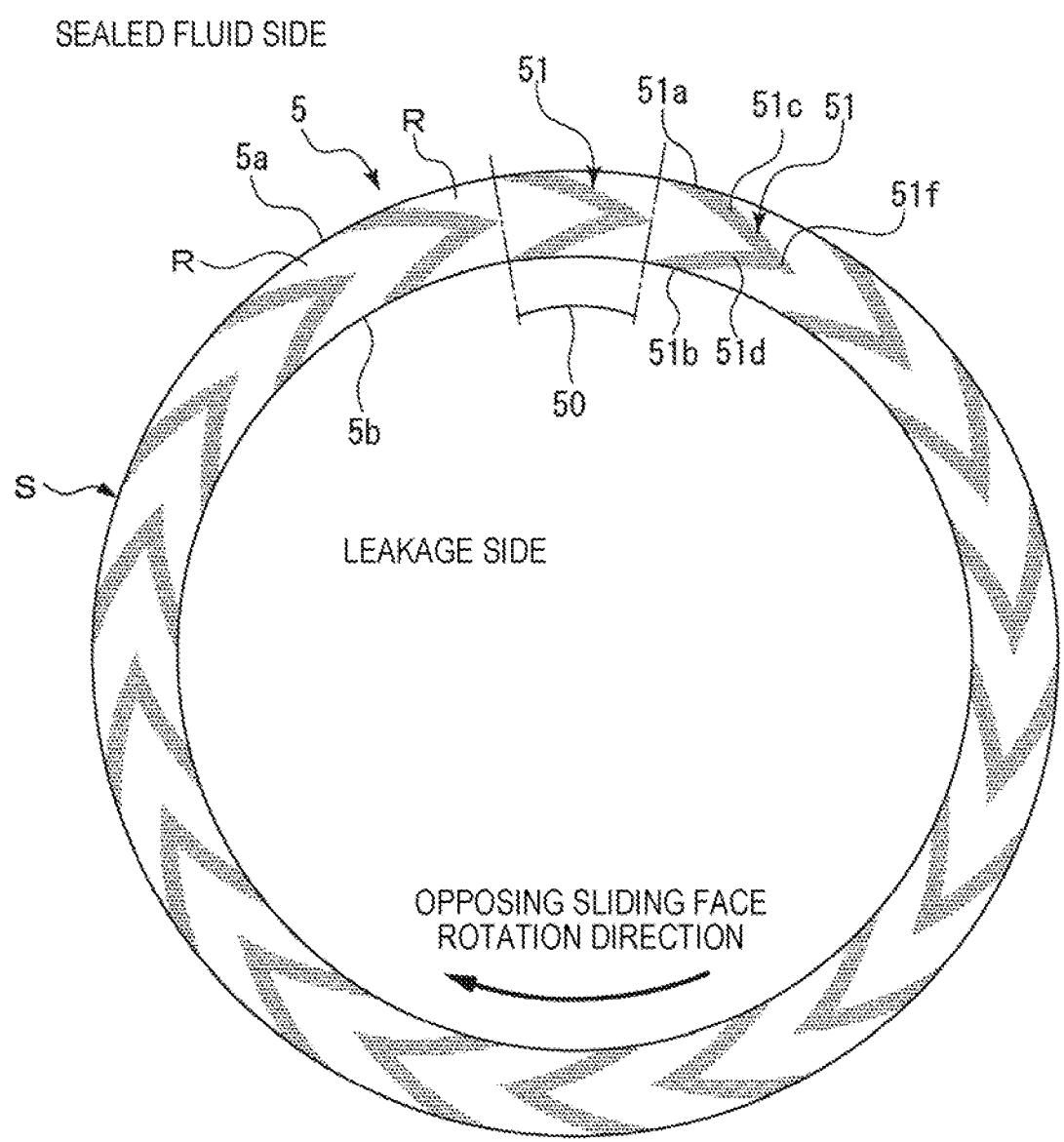
FIG. 12 is a W-W arrow view of FIG. 1, showing an example of a sliding face of a sliding component according to a fifth embodiment of the present invention.

As shown in FIG. 12, a sliding face S has plural regions 50 partitioned by a land portion, and a herringbone dimple group 51 is arranged in each of the regions 50. In FIG. 12, the regions are eighteen. However, the regions are not limited to this but only required to be one or more. The upper limit number is not particularly limited as long as the number is within a range where the dimple group can be arranged on the sliding face S.

The dimple group 51 is formed into a herringbone shape by a collective body of the plural dimples 12. In the dimple group 51, a band shaped body 51c communicating with an opening portion 51a of a sealed fluid side peripheral edge 5a and tilting and extending toward the center of the sliding face, and a band shaped body 51d communicating with an opening portion 51b of a leakage side peripheral edge 5b and tilting and extending toward the center of the sliding face join together in a joining portion 51f in the substantial center of the sliding face. The dimple group is partitioned by the land portion R excluding the opening portions 51a, 51b. The band shaped bodies 51c, 51d tilt with respect to the radial axis and extend on the rotation direction lagging side. Thus, it is possible to take in a fluid with low resistance.

When the opposing sliding face is rotated in the direction shown in FIG. 12, in the dimple group 51, the band shaped body 51c efficiently takes in the fluid from the sealed fluid side from the opening portion 51a. Further, the band shaped body 51d efficiently suctions the fluid from the leakage side from the opening portion 51b. The fluid flowing into the dimple group 51 flows along the band shaped bodies 51c, 51d and joins together in the joining portion 51f, so that positive pressure is generated and the fluid lubricating effect is exerted. In addition, the band shaped body 51d suctions the fluid from the leakage side, so that the sealing effect is exerted. In such a way, by a synergy effect of the fluid lubricating operation and the pumping operation of the dimples 12 forming the dimple group 51 and the fluid lubricating effect and the sealing effect generated by the dimple group formed into a herringbone shape as a whole, it is possible to furthermore improve the fluid lubricating effect and the sealing effect. By the dimple group 51 formed over the entire length in the radial direction of the sliding faces S, it is possible to prevent that the sliding faces S are brought into a poorly lubricated state even at the time of low speed rotation where a fluid lubricating film is not easily formed.

FIG. 13 shows a modified example of FIG. 12. A dimple group 61 of FIG. 13A is a modified example in which a collective body of plural dimples 12 is formed into a herringbone pseudo flow passage. In the herringbone dimple group 61, a band shaped body 61c communicates with the sealed fluid side by an opening portion 61a, while a band shaped body 61d is closed by a dead end portion 61e, and the band shaped body 61c and the band shaped body 61d join together in a joining portion 61f in the substantial center of the sliding face S. When the opposing sliding face is rotated, the fluid on the sealed fluid side flowing in from the opening portion 61a flows along the band shaped body 61c, while the fluid flowing in from the periphery of the dead end portion 61e flows along the band shaped body 61d, and the fluids join together in the joining portion 61f, so that positive pressure is generated and the fluid lubricating operation is exerted. In the dimple group 61, the band shaped body 61c takes in a large amount of the fluid on the sealed fluid side from the opening portion 61a, so that positive pressure is generated. Thus, the dimple group functions as a dimple group excellent in the fluid lubricating operation.

Meanwhile, a dimple group 71 of FIG. 13B is a further modified example in which a collective body of plural dimples 12 is formed into a herringbone pseudo flow passage. In the herringbone dimple group 71, a band shaped body 71c arranged on the sealed fluid side is closed by a dead end portion 71e, while a band shaped body 71d arranged on the leakage side communicates with the leakage side peripheral edge 5b by an opening portion 71b, and the band shaped body 71c and the band shaped body 71d join together in a joining portion 71f in the substantial center of the sliding face S. When the opposing sliding face is rotated, the fluid on the leakage side flowing in from the opening portion 71*b* flows along the band shaped body 71*d*, while the fluid flowing in from the periphery of the dead end portion 71*e* flows along the band shaped body 71*c*, and the fluids join together in the joining portion 71*f*, so that positive pressure is generated and the fluid lubricating operation is exerted. In the dimple group 71, the band shaped body 71*d* takes in a large amount of the fluid on the leakage side from the opening portion 71*b*. Thus, the dimple group functions as a dimple group excellent in the sealing function.

Sixth Embodiment

Next, sliding components according to a sixth embodiment will be described with reference to FIG. 14. The shape of a dimple group of the sixth embodiment is to form a spiral pseudo flow passage by a collective body of plural dimples 12. Further, the sixth embodiment is different from the above embodiments in a point that the plural dimples 12 are formed into a semi-ellipsoidal island shape. The same constituent parts as the constituent parts shown in the above embodiments will be given the same reference signs and the description will not be repeated.

As shown in FIG. 14A, a dimple group 161 in which the plural dimples 12 are arranged in a spiral shape is provided in each of regions (by the amount of 20 degrees) of a sliding face partitioned by a land portion. The dimple group 161 includes an opening portion 161*a* open at a sealed fluid side peripheral edge 5*a*, an opening portion 161*b* open at a leakage side peripheral edge 5*b*, and a spiral band shaped body 161*c* providing communication between the opening portion 161*a* and the opening portion 161*b*. The dimple group 161 is provided to tilt on the rotation direction lagging side. Thus, the leakage-side fluid is efficiently suctioned from the opening portion 161*a*, the suctioned fluid flows along the band shaped body 161*c*, and pressure is increased by centrifugal force. Therefore, the fluid of positive pressure is supplied to the sliding face over the substantially entire length of the band shaped body 161*c*, so that the fluid lubricating effect and the sealing effect are exerted. By the dimple group 161 formed over the entire length in the radial direction of the sliding faces S, it is possible to prevent that the sliding faces S are brought into a poorly lubricated state even at the time of low speed rotation where a fluid lubricating film is not easily formed.

As shown in FIG. 14B, an opening portion 171*b* provided in the leakage side peripheral edge 5*b* and an end portion of a spiral band shaped body 171*c* communicating with the opening portion 171*b* may be closed by a dead end portion 171*e*. In a dimple group 171, pressure of the fluid suctioned from the opening portion 171*b* is increased along the band shaped body 171*c* by the centrifugal force, and the fluid is blocked in the dead end portion 171*e*, so that positive pressure is generated, the fluid of positive pressure is supplied to the sliding face over the substantially entire length of the band shaped body 171*c*, and the fluid lubricating effect is exerted. The fluid is actively fed to the sealed fluid side from the leakage side in the dimple group 161 of FIG. 14A, whereas an amount of the fluid fed to the sealed fluid side from the leakage side is small in the dimple group 171 of FIG. 14B. Therefore, the dimple group 171 can limit a flow of the fluid to the sealed fluid side from the leakage-side fluid while exerting the fluid lubricating effect and the sealing effect.

As shown in FIG. 14C, a dimple group 181 having an opening portion 181*a* which is open at the sealed fluid side peripheral edge 5*a* may be arranged on the sealed fluid side, and a dimple group 191 having an opening portion 191*b* which is open at the leakage side peripheral edge 5*b* may be arranged on the leakage side. The dimple group 181 communicating with the sealed fluid side peripheral edge 5*a* takes in the fluid from the sealed fluid side and exerts the fluid lubricating function, and the dimple group 191 communicating with the leakage side peripheral edge 5*b* suctions the fluid to the sliding face S from the leakage side and exerts the sealing function. Therefore, when the proportion of the dimple group 191 is higher than that of the dimple group 181, the sliding components can be excellent in the sealing function. When the proportion of the dimple group 181 is higher than that of the dimple group 191, the sliding components can be excellent in the fluid lubricating function.

Seventh Embodiment

Next, sliding components according to a seventh embodiment will be described with reference to FIG. 15. The sliding components according to the first to sixth embodiments are to limit the fluid to leak out from the sealed fluid side to the leakage side in the radial direction. However, the sliding components according to the seventh embodiment are to limit a fluid to leak out from the sealed fluid side to the leakage side in the axial direction of sliding faces.

Figure 15:
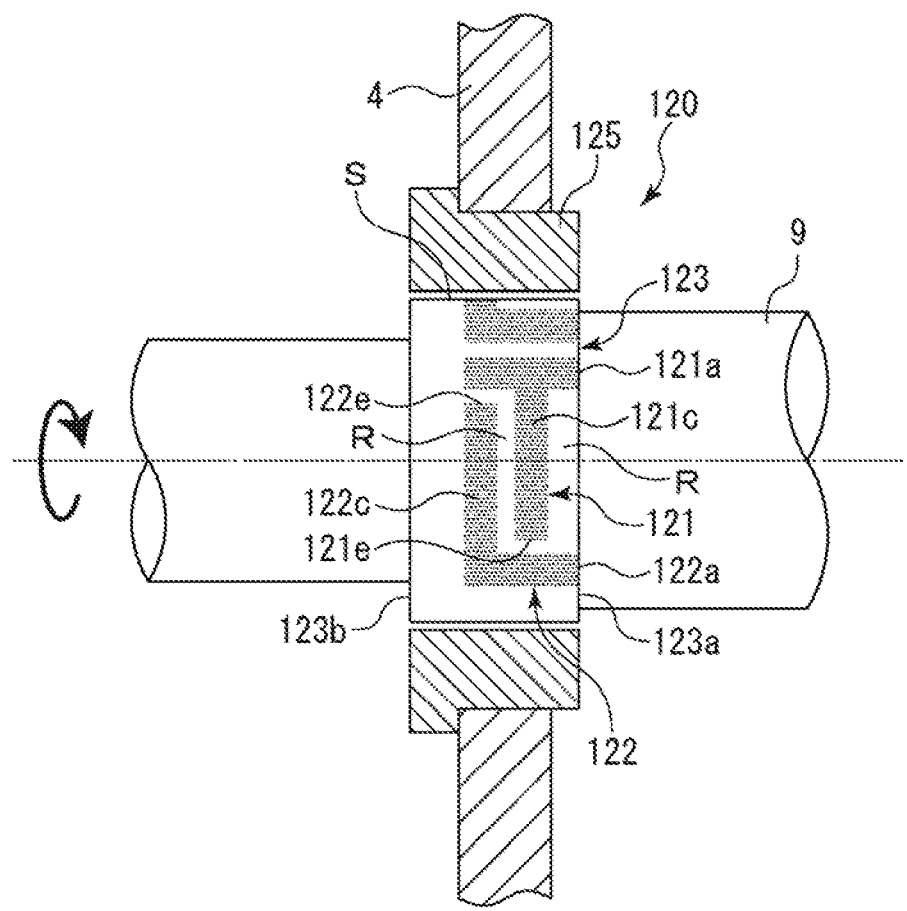
FIG. 15 is a view showing an example of a sliding face of a sliding component according to a seventh embodiment of the present invention.

As shown in FIG. 15, sliding components 120 include a cylindrical rotating side seal ring 123 serving as one sliding component provided in a state where the rotating side seal ring is rotatable integrally with a rotating shaft 9, and a cylindrical stationary side seal ring 125 serving as the other sliding component provided in a housing 4 in a non-rotating state. The sliding components are to let sliding faces S slide with respect to each other and limit the fluid to leak out in the axial direction of sliding faces. In FIG. 15, the right side of the rotating side seal ring 123 is the sealed fluid side and the left side is the leakage side, and a case where the rotating side seal ring 123 is rotated as shown by an arrow will be described.

The sliding face S of the rotating side seal ring 123 is provided with a dimple group 121 that generates positive pressure, and a dimple group 122 arranged on the leakage side of the dimple group 121, the dimple group that generates negative pressure. The dimple group 121 has an opening portion 121*a* provided in a sealed fluid side peripheral edge 123*a*, a band shaped body 121*c* communicating with the opening portion 121*a* and extending on the rotation direction lagging side, and a dead end portion 121*e* closed by a land portion R at an end portion of the band shaped body 121*c*. The dimple group 122 has an opening portion 122*a* provided in the sealed fluid side peripheral edge 123*a*, a band shaped body 122*c* communicating with the opening portion 122*a* and extending on the rotation direction forward side, and a dead end portion 122*e* closed by the land portion at an end portion of the band shaped body 122*c*.

When rotation is made in the direction shown in FIG. 15, a sealed fluid taken in from the opening portion 121*a* flows along the band shaped body 121*c* and is blocked in the dead end portion 121*e*, so that positive pressure is generated. The dimple group 121 functions as a pseudo flow passage that takes in the fluid from the sealed-side fluid and generates positive pressure, and exerts the fluid lubricating function. Meanwhile, the fluid taken in from the periphery of the dead end portion 122*e* flows along the band shaped body 122*c* and is released from the opening portion 122*a*, so that the dimple group 122 has negative pressure as a whole. Thereby, the whole dimple group 122 functions as the pseudo flow passage that suctions the fluid to the sliding face S from the leakage side and exerts the sealing function. With the dimple group 121 and the dimple group 122, the sliding components can also be excellent in the fluid lubricating effect and the sealing effect for the fluid to leak out of the sliding faces S in the axial direction.

Next, arrangement of the dimples 12 forming the dimple group according to the present invention will be described. Arrangement of the dimples 12 applicable to the dimple group according to the present invention includes an aligned dimple group formed by arranging sub dimple groups in which the dimples 12 are aligned based on a predetermined rule at predetermined pitches, and other than the aligned dimple group, a random dimple group formed by randomly arranging the dimples, and combination of the aligned dimple group and the random dimple group. Hereinafter, aligned dimples will be described.

Figure 16:
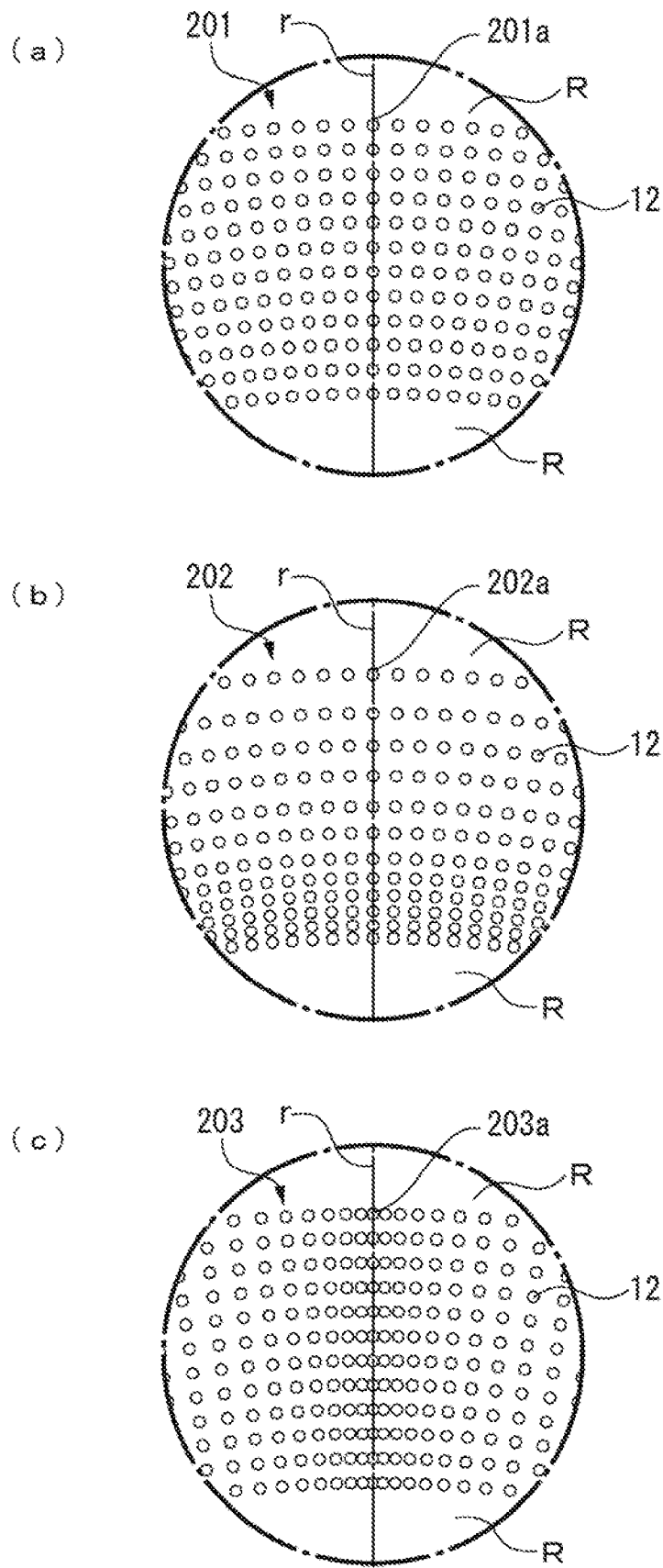
FIG. 16 is enlargement of an A portion of FIG. 2, showing an example of an aligned dimple group according to the present invention.

FIG. 16 shows examples of the aligned dimples. Aligned dimples 201 of FIG. 16A are formed by arranging sub dimple groups 201a in which the dimples 12 are arranged at fixed intervals along the radial axis r at fixed pitches in the circumferential direction. Aligned dimples 202 of FIG. 16B are formed by arranging sub dimple groups 202a in which the dimples 12 are arranged so that an interval is widened at a fixed rate from the inner diameter side to the outer diameter side along the radial axis r at fixed pitches in the circumferential direction. An aligned dimple group 203 of FIG. 16C is formed by arranging sub dimple groups 203a in which the dimples 12 are arranged at fixed intervals along the radial axis sparsely and densely in the circumferential direction.

In such a way, the aligned dimples is formed by arranging the sub dimple groups arranged based on the predetermined rule along one of the polar coordinate axes at predetermined pitches along the other axis. In FIGS. 16A to 16C, the dimples may be arranged in a zig-zag manner. Further, the coordinate axes are not limited to the polar coordinate but may be the orthogonal coordinate.

FIG. 17 shows another example of the aligned dimples. Aligned dimples 204 of FIG. 17A are formed by arranging sub dimple groups 204a arranged in the circumferential direction based on a function of sine at predetermined pitches along the radial axis. Aligned dimples 205 of FIG. 17B are formed by arranging sub dimple groups 205a arranged in the radial direction based on the function of sine at predetermined pitches along the circumferential axis.

The function is not limited to a periodic function such as a trigonometric function. For example, the function may be a periodic function of saw-tooth waves or square waves. The function is not limited to the periodic function but sub dimples arranged based on a non-periodic function such as a linear function, a quadratic function, an n-order function, or an exponent function may be arranged by displacing by predetermined pitches, the periodic functions may be overlapped with each other, or the periodic function and the non-periodic function may be combined.

FIG. 18 shows another example of the aligned dimples. An aligned dimple group 250 of FIG. 18A is formed by arranging sub dimple groups 251 in which the dimples 12 are arranged in a circular shape at predetermined pitches. In this case, the dimples 12 are not limited to a circular shape but may be arranged in other polygonal shapes such as a rectangle or a triangle at predetermined pitches. An aligned dimple group 260 of FIG. 18B is formed by arranging dimples 261 and dimples 262 having different size from each other in combination at predetermined pitches. An aligned dimple group 270 of FIG. 18C is formed by arranging triangular dimples 271 and circular dimples 272 having different shapes from each other in combination at predetermined pitches. That is, the aligned dimple group is formed by arranging the sub dimple groups in which the dimples 12 are aligned based on the predetermined rule at predetermined pitches. The aligned dimple groups of FIGS. 16 to 18 are shown as enlargement of an A portion of FIG. 2. However, the aligned dimple groups can be applied to the dimple groups of FIGS. 3 to 15 needless to say.

The arrangement of the dimples 12 applicable to the dimple group according to the present invention includes, other than the aligned dimple group, the random dimple group formed by randomly arranging the dimples. The random dimple group is a collective body of the dimples formed by randomly arranging the dimples 12 without any specific rules.

The embodiments of the present invention are described with the drawings above. Specific configurations are not limited to these embodiments but the present invention also includes changes and additions within the range not departing from the gist of the present invention.

For example, in the first to fourth embodiments, the outer peripheral side of the sliding components is described as the high pressure fluid side (sealed fluid side), and the inner peripheral side as the low pressure fluid side (leakage side). However, the present invention is not limited to this but is applicable to a case where the outer peripheral side of the sliding components is the low pressure fluid side (leakage side) and the inner peripheral side is the high pressure fluid side (sealed fluid side).

REFERENCE SIGNS LIST 1 mechanical seal
3 rotating side seal ring
4 housing
5 stationary side seal ring
5a sealed fluid side peripheral edge (outer peripheral surface)
5b leakage side peripheral edge (inner peripheral surface)
10 region
11 dimple group
11a opening portion
11c band shaped body
11e dead end portion
12 dimple
20 region
21 dimple group
21a opening portion
21c band shaped body
21e dead end portion
22 dimple group
22b opening portion
22c band shaped body
22e dead end portion
30 region
31 dimple group
31a opening portion
31c band shaped body
31e dead end portion
32 dimple group
32a opening portion
32c band shaped body
32e dead end portion
41 dimple group
41a opening portion
41b opening portion 41c band shaped body
41d connection portion
42e band shaped body
50 region
51 dimple group
51a opening portion
51b opening portion
51c band shaped body
51d band shaped body
51f joining portion
61 dimple group
61a opening portion
61c band shaped body
61d band shaped body
61e dead end portion
61f joining portion
67c band shaped body
71 dimple group
71b opening portion
71c band shaped body
71d band shaped body
71e dead end portion
71f joining portion
80 region
81 dimple group
81a opening portion
81c band shaped body
81e dead end portion
91 dynamic pressure generation groove
91b opening portion
91c groove portion
91e dead end portion
92 dynamic pressure generation mechanism
100 region
101 dimple group
101e dead end portion
102 island shaped groove portion
102e dead end portion
103 fluid introduction portion
103a opening portion
103b opening portion
104 dynamic pressure generation mechanism
111a opening portion
120 sliding component
121 dimple group
121a opening portion
121c band shaped body
121e dead end portion
122 dimple group
122a opening portion
122c band shaped body
122e dead end portion
123 rotating side seal ring
123a sealed fluid side peripheral edge (sealed fluid side end surface)
123b leakage side peripheral edge (leakage side end surface)
124 rotating side seal ring
125 stationary side seal ring
141 dimple group
141a opening portion
141c band shaped body
141e dead end portion
141f dead end portion
150 region
151 dimple group
151a opening portion
151c band shaped body
151e dead end portion
161 dimple group
161a opening portion
161b opening portion
161c band shaped body
171 dimple group
171b opening portion
171c band shaped body
171e dead end portion
181 dimple group
181a opening portion
191 dimple group
191b opening portion
201 aligned dimple
201a sub dimple group
202 aligned dimple
202a sub dimple group
203 aligned dimple group
203a sub dimple group
204 aligned dimple
204a sub dimple group
205 aligned dimple
205a sub dimple group
211 dimple group
212 fluid introduction portion
231 dimple group
241 dynamic pressure generation groove
242 dynamic pressure generation mechanism
250 aligned dimple group
251 sub dimple group
260 aligned dimple group
261 dimple
262 dimple
270 aligned dimple group
271 triangular dimple
272 circular dimple
R land portion
S sliding face
r radial axis

The invention claimed is:

1. A pair of sliding components, each sliding component having a sliding face that slides with respect to each other, the pair of sliding components are part of a seal configured for separating a sealed fluid side from a leakage side, wherein:
at least one sliding face is located on one side of one of the sliding components and includes plural dimple groups in which at least one of the dimple groups extends in an opposite direction from another of the dimple groups, and
wherein each of the dimple group extends in a circumferential direction from an opening portion on the sealed fluid side, wherein each dimple group is formed as a pseudo flow passage and is completely surrounded by a land portion except at the opening portion, and each opening portion is formed to be a fluid introduction groove which communicates with a respective one of the dimple group.

2. The sliding components according to claim 1, wherein the sliding face on the one side includes at least one pair of the dimple groups extending in the opposite directions to each other from the opening portion on the sealed fluid side.

3. The sliding components according to claim 1, wherein each dimple group is an aligned dimple group formed by arranging and aligning the plural dimples.

4. The sliding components according to claim 3, wherein each aligned dimple group is formed by arranging sub dimple groups in which the dimples are aligned based on a predetermined rule at predetermined pitches.

5. A mechanical seal comprising a rotating seal ring and a stationary seal ring, the seal rings cooperating with each other to separate a sealed fluid side from a leakage side,
- wherein each seal ring comprises a sliding face, relatively slidable with respect each other,
- wherein at least one of the sliding faces includes a plurality of circumferentially spaced T-shaped dimple groups, each formed by plural dimples, and a land portion,
- wherein each dimple group comprises of at least one opening portion open to an outer circumferential side of the respective seal ring to be open to the sealed fluid side and where each dimple group meets an outer circumference of the sliding face,
- wherein an overall circumferential width of the opening portion is substantially smaller than the overall circumferential width of the dimple group,
- wherein each dimple group is formed as a pseudo flow passage and is completely surrounded by the land portion except at the opening portion, each opening portion is formed to be a fluid introduction groove which communicates with a respective one of the dimple groups, and
- wherein the sliding face does not comprise any true flow passages.

\* \* \* \* \*